(12) United States Patent
Masaki

(10) Patent No.: US 8,130,279 B2
(45) Date of Patent: Mar. 6, 2012

(54) IMAGE SENSING APPARATUS SENSING MOVING AND STILL IMAGES, METHOD THEREOF, STORAGE MEDIUM AND COMPUTER PROGRAM

(75) Inventor: Junya Masaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/413,148

(22) Filed: Apr. 28, 2006

(65) Prior Publication Data

US 2006/0264733 A1    Nov. 23, 2006

(30) Foreign Application Priority Data

Apr. 28, 2005 (JP) ................................ 2005-133185

(51) Int. Cl.
*H04N 5/225* (2006.01)
*H04N 5/228* (2006.01)
(52) U.S. Cl. .................. 348/220.1; 348/222.1
(58) Field of Classification Search .............. 348/221.1, 348/231.2, 231.3, 231.6, 231.9, 220.1; 386/38, 386/107, 120, 121, 210, 224–226, 242, 333, 386/348
See application file for complete search history.

(56) References Cited

U.S. PATENT DOCUMENTS

| | | | | |
|---|---|---|---|---|
| 6,961,083 B2 * | 11/2005 | Obrador et al. | ............ | 348/220.1 |
| 7,257,317 B2 * | 8/2007 | Ohnishi | ........................ | 386/120 |
| 7,317,477 B2 * | 1/2008 | Shimizu | ..................... | 348/220.1 |
| 7,324,136 B2 * | 1/2008 | Kubo | ......................... | 348/220.1 |
| 7,489,348 B2 * | 2/2009 | Okada et al. | ................ | 348/231.2 |
| 7,573,504 B2 | 8/2009 | Takane | | |
| 7,692,690 B2 * | 4/2010 | Honma | ....................... | 348/220.1 |
| 7,903,162 B2 * | 3/2011 | Juen | ........................ | 348/333.01 |
| 2002/0024602 A1 * | 2/2002 | Juen | .............................. | 348/220 |
| 2003/0095191 A1 * | 5/2003 | Saito | ......................... | 348/220.1 |
| 2004/0051793 A1 * | 3/2004 | Tecu et al. | ................ | 348/231.99 |
| 2004/0189823 A1 * | 9/2004 | Shibutani | ................... | 348/231.1 |
| 2005/0046707 A1 | 3/2005 | Takane | | |
| 2006/0268117 A1 * | 11/2006 | Loui et al. | .................. | 348/220.1 |

FOREIGN PATENT DOCUMENTS

| | | |
|---|---|---|
| JP | 10-108121 A | 4/1998 |
| JP | 2001-326896 | 11/2001 |
| JP | 2002-044531 | 2/2002 |
| JP | 2003-018456 | 1/2003 |
| JP | 2003-158653 | 5/2003 |
| JP | 2005-080059 | 3/2005 |

* cited by examiner

*Primary Examiner* — David Ometz
*Assistant Examiner* — Carramah J Quiett
(74) *Attorney, Agent, or Firm* — Fitzpatrick, Cella, Harper & Scinto

(57) ABSTRACT

An image sensing apparatus includes an imager, an image reducer for reducing an image size from imaging data obtained from the imager, a moving image configurer for rendering an image reduced by the image reducer as a moving image, an image processor for image-processing image data, a network communicator, and a storing device for storing frame image data obtained from the imager in response to a control instruction from the outside while taking a moving image. The image data stored in the storing device is image-processed by dividing it into non-operating periods of moving image processing per frame configuring the moving image. Also, parallel processing of a moving image and a still image is performed without lowering a frame rate of the moving image.

13 Claims, 18 Drawing Sheets

FIG. 17

Table 162d:

| CD CYCLE TIME | DELAY TIME FOR MOVING IMAGE PROCESSING | MOVING IMAGE SIZE | STILL IMAGE SIZE | DIVISION NUMBER |
|---|---|---|---|---|
| 171 | 172 | 173 | 174 | 175 |
| | | 640 × 480 | 1280 × 960 | 4 |
| | | 640 × 480 | 2560 × 1920 | 16 |
| .... | .... | .... | .... | .... |

Table 162f:

| CD CYCLE TIME | MOVING IMAGE SIZE | MOVING IMAGE PROCESSING RATE | DELAY TIME FOR MOVING IMAGE PROCESSING |
|---|---|---|---|
| 176 | 177 | 178 | 179 |
| | 640 × 480 | | |
| .... | .... | .... | .... |

IMAGE SENSING APPARATUS SENSING MOVING AND STILL IMAGES, METHOD THEREOF, STORAGE MEDIUM AND COMPUTER PROGRAM

FIELD OF THE INVENTION

The present invention relates to an image sensing apparatus, a method thereof, a storage medium and a computer program, and in particular, to a suitable technology for processing a moving image and a still image in parallel for instance.

BACKGROUND OF THE INVENTION

A conventional image sensing apparatus, which captures a high density still image when instructed to capture a still image by external manipulation while sensing a moving image, is provided. For example, the apparatus has multiple image processing systems, one for a still image and another for a moving image, and processes a still image in a still image system. The still image to be processed is constructed with several frames by sequentially processing area portions of a screen separated by a frame period or a field period, as in Japanese Patent Laid-Open No. 2001-326896.

For another example, an apparatus having an image sensing device for reading out moving and still images in separate modes is provided. The apparatus can switch to still image reading on receipt of a still image continuous sensing command while storing a moving image, to continuously shoot only a preset number of still images, and repeatedly processes one moving image and one still image. It is arranged to lower the frame rate of moving image data to process the still image in this case, refer to Japanese Patent Laid-Open No. 2003-158653.

As for the conventional examples, however, Japanese Patent Laid-Open No. 2001-326896 has problems that its LSI chip area increases because it is arranged to have multiple image processing blocks for the still images and for the moving images. Also, power consumption increases because it performs simultaneous parallel image processing of the moving image and the still image. As for Japanese Patent Laid-Open No. 2003-158653, there is a problem that the frame rate of the moving image decreases on capturing the still image while storing the moving image.

SUMMARY OF THE INVENTION

In view of the aforementioned problems, an object of the present invention is to allow parallel processing of a moving image and a still image without lowering the frame rate of the moving image.

A further object is to prevent the area of the image processing chip from increasing.

To solve these problems, the present invention provides an image sensing apparatus and the like comprising: imaging means; image reducing means for reducing an image size from imaging data obtained from the imaging means; moving image configuring means for rendering an image reduced by the image reducing means as a moving image; image processing means for image-processing image data; network communication means; and image data storing means for storing frame image data obtained from the imaging means in response to a control instruction from outside while taking a moving image. The image data stored in the image data storing means is image-processed by dividing it into non-operating periods of moving image processing per frame configuring the moving image.

According to the present invention described above, it is possible, when capturing a still image of a larger size than a moving image while taking the moving image, to deliver it on a network or record it without lowering the frame rate of the moving image at all.

Furthermore, continuous sensing of large-screen still images while taking the moving image becomes possible within the entire pixel memory amount, and continuous sensing by VD becomes possible so as to obtain the images continuously shot at the same speed as moving image frames.

Furthermore, it is not necessary to have multiple image processing circuit blocks, and so the control can be realized with no need to increase the circuit scale on rendering it as LSI. It is possible to reduce power consumption of circuits by preventing the increase in the circuit scale. It is also possible to save electric power on processing the moving image because the period for reducing the still image for the sake of configuring the moving image is limited to a VD period in which all the pixels of the still image are being read out.

Furthermore, it is possible, when capturing the still image while taking the moving image with an image sensing device requiring a mechanical shutter, to reduce the frames blacking out as the moving image. Thus, it is possible to provide the image with little discomfort to the user as the moving image.

Furthermore, it is possible to realize a process capable of handling any high-pixel image sensing device. It is possible, by speeding up moving image processing, to reduce the number of divisions of the still image, reduce the still image processing period, and increase the number of frames of large-screen still image continuous sensing. Further, it is possible to cut down on the entire pixel memory amount if the large-screen still image continuous sensing is within a prescribed number of frames.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a diagram showing a table for a number representing the number of portions into which a still image is divided and a table for a delay time until the 1 starting of moving image processing of the present invention.

DETAILED DESCRIPTION OF THE PREFERRED EMBODIMENTS

First Embodiment

Figure 1:
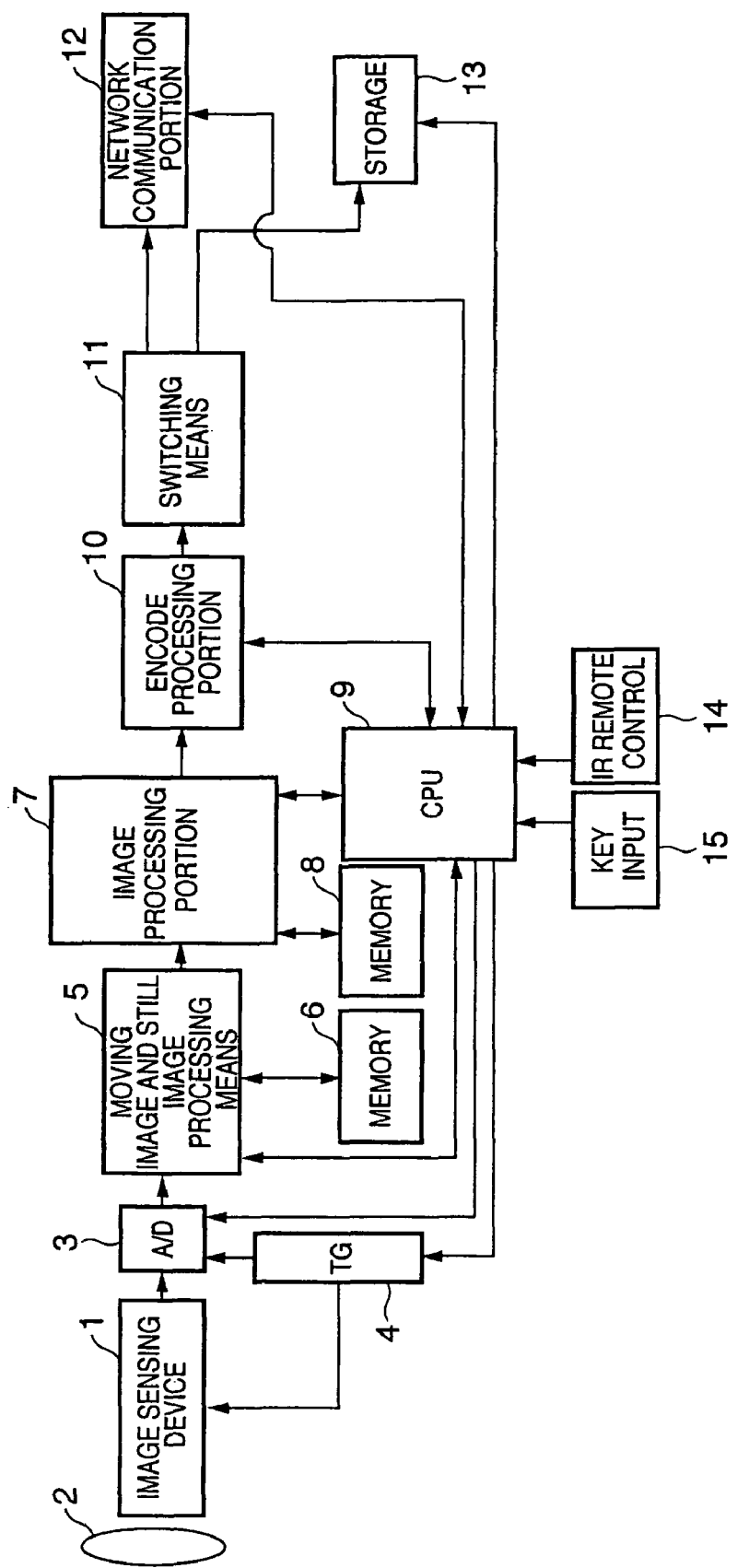
FIG. 1 is an overall configuration block diagram of an image sensing apparatus according to first, second, fourth and seventh embodiments of the present invention.
Figure 2:
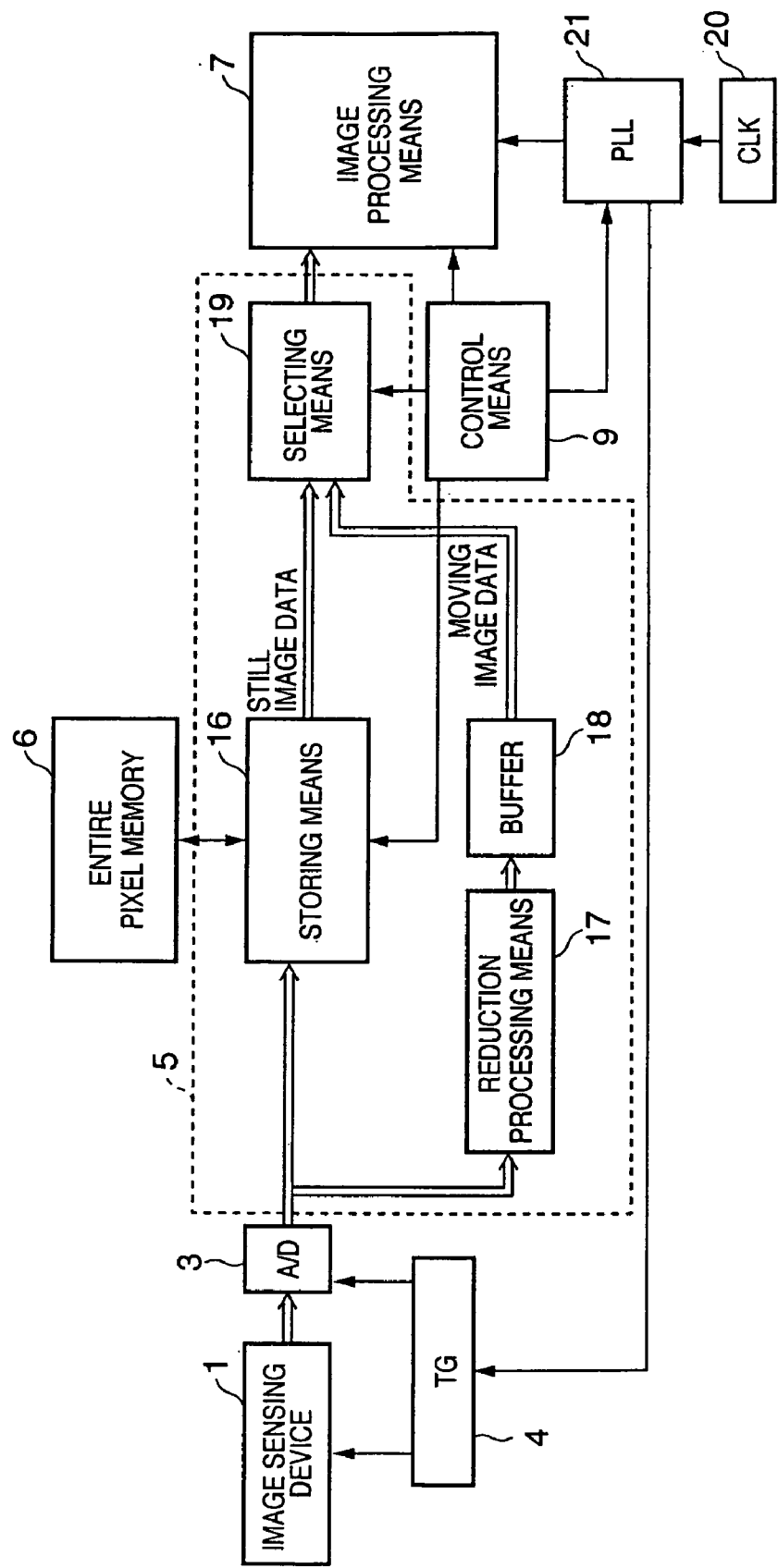
FIG. 2 is a configuration block diagram representing the first and seventh embodiments of the present invention.
Figure 3:
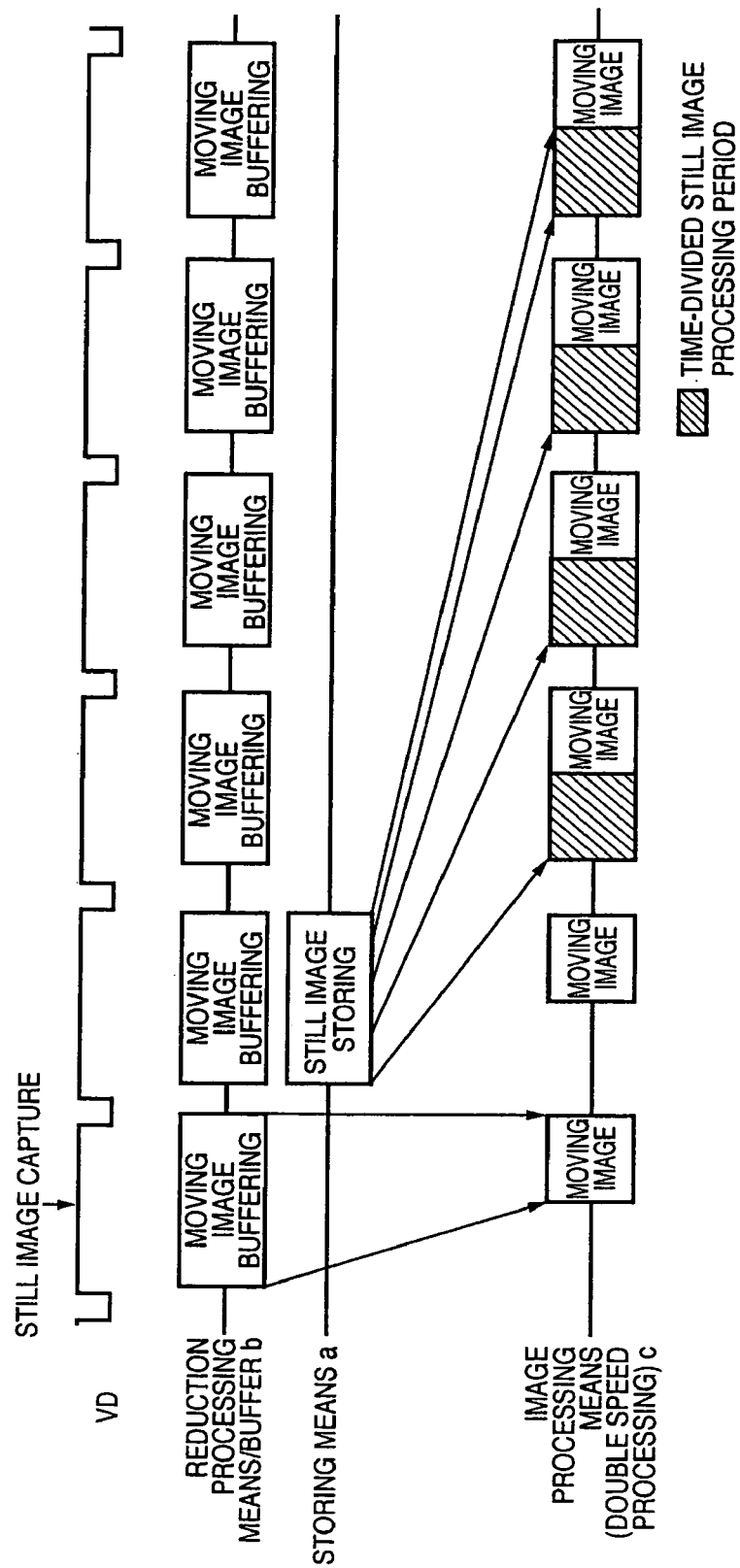
FIG. 3 is a diagram showing a timing chart representing the first embodiment of the present invention.

FIGS. 1 to 3 are diagrams representing the first embodiment of the present invention. FIG. 1 is a block diagram representing the entire overview of an image sensing apparatus of the present invention. FIG. 2 is a block diagram showing characteristics relating to the first embodiment of the present invention. FIG. 3 is a timing chart of various processes representing the characteristics of this embodiment.

In the configuration order of FIG. 1, reference numeral 1 indicates an image sensing device which is a photoelectric conversion element. Though not particularly limited as the image sensing device, it represents the image sensing device such as a CCD or a CMOS sensor, which is the image sensing device capable of reading out all the pixels within one frame period configuring a moving image as the first embodiment. Reference numeral 2 indicates a lens. Reference numeral 3 indicates an AD conversion portion in control of AD conversion for digital-converting analog imaging data from the CCD or CMOS sensor, which is the image sensing device 1, corresponding to a predetermined quantization bit.

Reference numeral 4 indicates a timing generator for controlling the timing of the image sensing device 1 and the AD conversion portion 3. Reference numeral 5 indicates moving image and still image processing means for dividing the data AD converted by the AD conversion portion 3 into moving image signals and still image signals to reduce and buffer the images.

Reference numeral 6 indicates a memory for storing frame image data for still image divided by the moving image and still image processing means 5. In this embodiment, memory 6 can be RAM, which is just an example, and it is not limited thereto if it is an element having an access speed of a sufficient level.

Reference numeral 7 indicates an image processing portion for performing a processing procedure on moving image data and still image data obtained from the moving image and still image processing means 5. Reference numeral 8 indicates a memory for temporarily storing processed data and unprocessed data when processing the images in the image processing portion 7. In this embodiment, memory 8 can be RAM which is just an example, and it is not limited thereto if it is an element having an access speed of a sufficient level.

Reference numeral 9 indicates a CPU as control means for controlling a system of this embodiment. Reference numeral 10 indicates an encode processing portion for compressing the data image-processed by the image processing portion 7 according to a predetermined format. As the image format is compliant with a standard such as JPEG or MPEG, this embodiment describes it as a JPEG encoder though it is not particularly limited thereto.

Reference numeral 11 indicates switching means for switching whether to record or communicate on the network the moving image data and still image data compressed by the encode processing portion 10. Reference numeral 12 indicates a network communication portion for communicating a communication command from an external network or delivering or communicating the moving image and still image processed in each of the blocks 1 to 11 to the outside.

Reference numeral 13 indicates a storage unit as storing means for storing the moving image data or still image data in the image sensing apparatus of this embodiment. While FIG. 1 describes it as the storage unit, it indicates the one capable of data storage in general such as a nonvolatile memory, a medium, or a hard disk capable of data writing, which may be replaceable and is not particularly limited.

Reference numeral 14 indicates an infrared remote control receiving portion for receiving a remote control command from outside. Reference numeral 15 indicates a key input portion directly operable by the user from outside.

The configuration is configured on one chip when rendering as an LSI to include each of the blocks of the AD conversion portion 3, the timing generator 4, the moving image and still image processing means 5, the image processing portion 7, the CPU 9, encode processing portion 10 and the switching means 11. It is also possible, instead of rendering them as one chip, to configure each of the processing blocks separately or render them as an LSI configuration which is convenient for implementation of the devices.

Next, FIG. 2 is a block diagram for describing the blocks described as reference numerals 1 to 9 of FIG. 1 in detail, where reference numerals 1, 3, 4, 6, 7 and 9 of FIG. 2 correspond to the aforementioned reference numerals 1, 3, 4, 6, 7 and 9 of FIG. 1. A structure surrounded by a dot line in FIG. 2 corresponds to the moving image and still image processing means 5 in FIG. 1.

Reference numeral 16 indicates storing means for storing readout data corresponding to all the pixels of the image sensing device 1 with the imaging data AD converted by the AD conversion portion 3 as the still image data when capturing the still image in response to external control command input.

Reference numeral 17 indicates reduction processing means for reducing the imaging data corresponding to all the pixels AD converted by the AD conversion portion 3 to an image size configuring the moving image. Reference numeral 18 indicates a buffer memory for holding the reduced image data from the reduction processing means 17 for a predetermined period and buffering the data.

Reference numeral 19 indicates selecting means for selecting image processing of the moving image and the still image in response to control from the CPU 9. Reference numeral 20 indicates a transmitter for generating a clock necessary for operation of this system, and reference numeral 21 indicates a PLL circuit for multiplying a frequency of the transmitter of the selecting means 19 to set it at a fast frequency.

A description will be provided that uses a timing chart of FIG. 3 to describe the processing flow in the configuration of FIGS. 1 and 2.

The description of the signals and processes of FIG. 3 will start by discussing the signal and process shown at the top thereof and will then discuss the remaining signals and processes in descending vertical order as shown in the figure. VD indicates a vertical synchronizing signal for configuring the moving image. Reference character b indicates the timing of reduction processing for creating an image configuring the moving image and the buffering operation of the reduced data in the reduction processing means 17 and the buffer memory 8. Reference character a indicates the timing for storing and storing the data in the storing means for storing the still image by the entire pixel memory 6 and storing means 16. Reference character c indicates the timing for performing image processing in the image processing portion 7.

In the data flow in sensing the moving image normally, the period up to the point described by a downward arrow as still image capture in FIG. 3 represents a moving image sensing period. The timing between a VD signal and a next VD signal represents a unit frame period of the moving image.

(Moving Image Sensing Period)

The control means 9, via the timing generator 4, controls the image sensing device 1 ready for reading out all the pixels to start reading out the imaging data corresponding to all the pixels. Next, according to timing of the timing generator 4, the data digitized by the AD conversion portion 3 undergoes image reduction by reduction processing means 17 and temporary buffering of the reduced image data by the buffer 18 in the order of the pieces of the data read out. The reduced and buffered image data is configured for the moving image.

The image data for the moving image temporarily buffered in the buffer 18 is selected by the selecting means 19. After the elapse of a predetermined time from the start of moving image buffering shown in the portion of FIG. 3 indicated by reference character b, the image processing shown in the portion of FIG. 3 indicated by reference character c is sequentially performed on the moving images by image processing means 7. In this case, the moving image processing starting time is delayed by the predetermined time, and the moving image processing is set in a time period not to overtake the data buffered in the buffer 18, but to perform the moving image processing at a high speed to an extent to keep it within a moving image frame. It is well known to set the predetermined delay time and control underrun or overflow of the buffer 18, in accordance with the transfer rate of image data supplied to the buffer 18 and the transfer rate of image data outputted from the buffer 18.

In this case, a high-speed clock is supplied by the PLL circuit 21, and high-speed processing is realized by the image processing portion 7. The contents to be image-processed in the description indicate a normal processing procedure, which performs a filtering process of the image and a luminance correction process, a color difference correction process, and the like thereof to create an optimal image. As details of the processing contents are techniques heretofore known, and are different depending on the points of view of manufacturers and the like relating to the images, a description thereof will be omitted.

As the image processing portion 7 performs various kinds of image processing operations, the memory 8 of FIG. 1 temporarily buffers the image data that undergoes different kinds of image processing operations sequentially in chronological order by the image processing portion 7, and passes and receives the data to and from the image processing portion 7. Memory access and the like of the image processing portion is a technique heretofore known, and so a description thereof will be omitted.

Next, the data having completed the image processing operations is configured as one image within a frame period which is 1 VD period, and the data is passed to the encode processing portion 10, which is the next processing block. The encode processing portion 10 compresses the image-processed data in the JPEG format as a preset and a predetermined image format. Whether the encoded data is stored in the storage area inside the image sensing apparatus or is communicated to an external destination via the network communication portion 12 is determined by the switching means 11.

The image sensing apparatus is in such a state, because the CPU 9 operates in a moving image sensing mode in response to a control instruction from outside. The destination of the moving image data is set to correspond to a control command controlled from outside in advance, and is in a state of either communicating the moving image data to external devices via the network communication portion 12 or storing the moving image data sequentially in the storage unit 13.

(Capture Still Image)

A description will be provided as to the case where the CPU 9 receives a command for requesting capture of a still image of a size larger than the image size of the moving image from any one of the network communication portion 12, the infrared remote control receiving portion 14 and the key input portion 15 during the aforementioned moving image sensing. In the case of receiving the command at the point described as still image capture shown in FIG. 3, the storing means 16 starts storing output signals from the AD conversion portion 3 in readout order starting from a first VD (vertical synchronizing signal) after receiving the capture command and stores them sequentially in the memory 6 until the readout is completed.

At the same time, the reduction and buffering operations of the moving image data performed by the above described reduction processing means 17 and the buffer 18 and the storing process of the still image performed by the storing means 16 are executed in parallel within the same period. The data stored in the memory 6 for the still image is passed, to perform the image processing of the still image data, to the image processing portion 7 at a time other than the moving image processing time in a period after counting predetermined VD periods (that is, including a next count) as shown in blanks in the section labeled by the letter c in FIG. 3.

When image-processing the still image not to influence the moving image processing time in the same image processing portion, it is not possible to perform data processing of the entire data of one still image of a size larger than the moving image. Therefore, the still image is processed by having each frame of the still image divided into the preset image areas and processing image data in the divided area within a non-processing time, as shown in a blank in the portion of FIG. 3 identified by reference letter c, not performing the moving image processing.

According to this embodiment, the moving image normally has a VGA size (640×480) while the still image is represented in a still image size (size corresponding to all the pixels) of 1280×960 which is twice as large vertically and horizontally. In this case, the number of divided areas is four. In another case of the still image size corresponding to a larger image size for instance, the number of divided areas is increased and the still image is processed in a unit of the divided area as described above. In the case of an image size twice as large vertically and horizontally as 1280×960 for instance, the still image is processed by dividing it into 16 pieces. However, this is just an example, and the number of divisions is set up according to the still image size, the moving image size, and so on.

Thus, the number of divisions corresponds to the number of VD frames so that the image processing of the still image is completed within a time period equivalent to the elapsing of 4 VDs in the case of 4 divided areas. The moving image data then undergoes a JPEG image compression process sequentially in an image compression processing portion which is the encode processing portion 10 so as to be configured as a Motion-JPEG image.

After the compression process, the moving image is stored in the storage unit 13 for storing the sensed moving image described above or has its data passed to the network communication portion 12. As for the still image, the divided image data is sequentially stored in the memory 8 once by the image processing portion 7, and is passed to the encode processing portion 10 as the still image after completely storing the image data of one frame image so as to undergo a JPEG compression process.

When a block of the still image to be encoded in this case is 1 block, after receiving a moving image communication or a storage finish command, it is delivered as one still image by the network communication portion 12 in the case of communication, or is recorded as one still image in the storage in the case of the storage. In the case where the encode processing portion 10 is capable of high-speed processing, however, it may be arranged to compress one still image in a non-compression processing time of a moving image after image-processing of one still image finishes, but not after receiving the moving image communication or the storage finish command.

In the case of receiving a still image capture command from outside again during a still image division processing (including a successive capture request) in the above description, still image capture operations are successively performed to the extent of not causing the captured image data to overflow the amounts of the memories 6 and 8.

As a first effect of realizing this embodiment as described above, it is possible, even when capturing the still image of a larger size than the moving image while taking the moving image, to deliver the moving image on the network or record the moving image without lowering the frame rate of the moving image at all.

As a second effect, successive capture of large still images while taking the moving image becomes possible within the amount of the entire pixel memory 6. That is, successive capture during continuous VDs becomes possible so as to obtain the images successively captured at the same speed as moving image frames.

As a third effect, it is not necessary to have multiple different image processing circuit blocks, one for the moving image and another for the still image, and so the control function can be realized with no need to increase the circuit scale on designing the circuits as an LSI.

As a fourth effect, it is possible to reduce the power consumption of the circuits by preventing an increase in the circuit scale.

Second Embodiment

Figure 4:
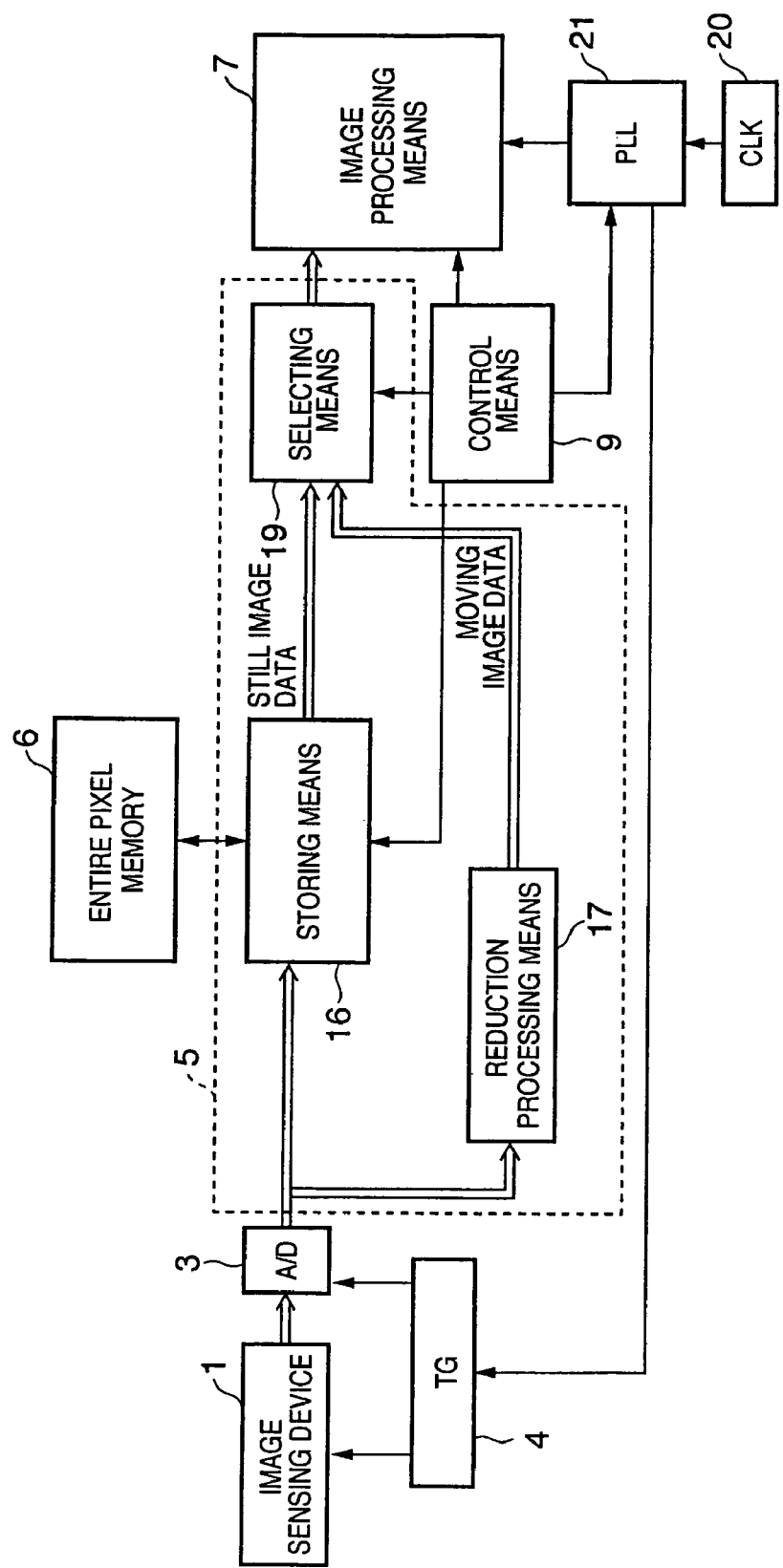
FIG. 4 is a configuration block diagram representing the second embodiment of the present invention.
Figure 5:
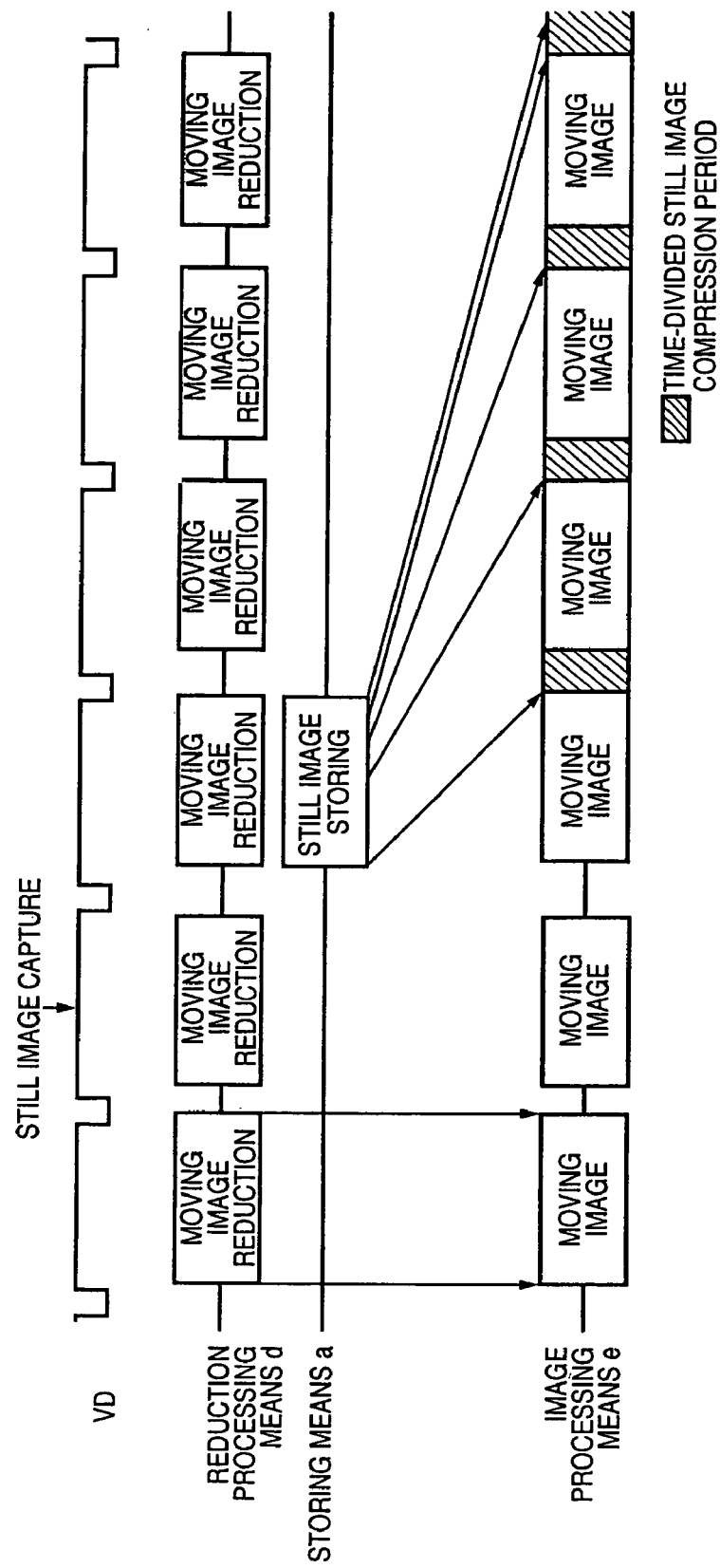
FIG. 5 is a diagram showing a timing chart representing the second embodiment of the present invention.

FIGS. 1, 4 and 5 are diagrams representing a second embodiment of the present invention. A block diagram showing an image sensing apparatus of the second embodiment is the same configuration as that described in FIG. 1 of the first embodiment. FIG. 4 is a block diagram showing the characteristics relating to the second embodiment of the present invention. FIG. 5 is a timing chart representing the characteristics of this embodiment.

The configuration of FIG. 4 is a block diagram corresponding to reference numerals 1 to 21 of FIG. 2 described in the first embodiment, which is different therefrom in that the configuration does not have the buffer memory 18 described in FIG. 2. The structure surrounded by a dot line in FIG. 4 corresponds to the moving image and the still image processing means 5. The blocks of FIGS. 1 and 4 have the same functions and configurations as the blocks of FIGS. 1 and 2 described in the first embodiment, and so a description thereof will be omitted.

Therefore, the timing chart of FIG. 5 will be described hereinafter.

In descending vertical order of the signals and processes shown in FIG. 5, VD indicates a vertical synchronizing signal for configuring the moving image, reference character d indicates a reduction processing operation period of the reduction processing means 17, reference character a indicates a timing for storing the still image data in the entire pixel memory 6 by the storing means 16, and reference character e indicates a timing for performing image processing in the image processing portion 7.

Next, the contents of the present invention will be described along with the timing chart.
(Moving Image Sensing Period)

First, in the data flow upon sensing the moving image normally, the period up to the point described by a downward arrow as the still image captured in FIG. 5 represents a moving image sensing period. The timing between a VD signal and a next VD signal represents a unit frame period of the moving image. The control means 9, via the timing generator 4, controls the image sensing device 1 to be ready for reading out all the pixels to start reading out the imaging data corresponding to all the pixels.

Next, according to the timing of the timing generator 4, the image data digitized by the AD conversion portion 3 undergoes image reduction by the reduction processing means 17 in the order of the pieces of the image data read out so as to configure the processed image for the moving image. It is different from the first embodiment in that the reduced image is not buffered in the buffer 18.

Here, the moving image data is selected by the selecting means 19, and the moving image processing shown in the portion of FIG. 5 identified by reference letter e is sequentially performed by the image processing portion 7 in the order of the moving image reduction processing shown in the portion of FIG. 5 identified by reference letter d. The image processing contents indicate the normal processing procedure, which performs a filtering process of the image and a luminance correction process, a color difference correction process, and the like thereof to create an optimal image. Since details of the processing contents are techniques heretofore known, and are different depending on the points of view of manufacturers and the like relating to the images, therefore, a description thereof will be omitted.

As the image processing portion 7 performs various kinds of image processing, the memory 8 temporarily buffers the image data that undergoes various kinds of image processing sequentially in chronological order by the image processing portion 7, and passes and receives the data to and from the image processing portion 7. Memory access and the like of the image processing portion 7 are performed by a technique heretofore known, and so a description thereof will be omitted.

Next, the data having completed the image processing operations is configured as one image within a frame period which is 1 VD period, and the data of one frame image is passed to the encode processing portion 10, which is the next processing block. The encode processing portion 10 compresses the image-processed data in the JPEG format as a preset and predetermined image format. Whether the encoded data is stored in the storage medium inside the image sensing apparatus or communicated to an external destination via the network communication portion 12 is determined by the switching means 11.

The image sensing apparatus is in such a state, because the CPU 9 operates in a moving image sensing mode in response to a control instruction from outside. The destination of the moving image data is set to correspond to a control command controlled from outside in advance, and is in a state of either communicating the moving image data to external devices via the network communication portion 12 or storing the moving image data sequentially in the storage unit 13.

(Capture Still Image)

A description will be provided as to the case where the CPU 9 receives a command for requesting a capture of a still image of a size larger than the image size of the moving image from any one of the network communication portion 12, the infrared remote control receiving portion 14 and the key input portion 15 during the aforementioned moving image sensing.

In the case of receiving the command at the point described as the still image capture shown in FIG. 5, the storing means 16 stores the output signals from the AD conversion portion 3 in readout order starting from the first VD (vertical synchronizing signal) after receiving the capture command, and stores them sequentially in the entire pixel memory 6 by the storing means 16 until the readout is completed.

At the same time, the reduction processing is sequentially executed by the reduction processing means 17 in a timing of the periods of the reduction processing means illustrated in the portion of FIG. 5 identified by reference letter d. The data stored for the still image in the entire pixel memory 6 by the storing means 16 is passed, to perform the image processing of the still image, to the image processing portion 7 in the non-processing time other than the moving image processing time in a period as shown in blanks in the portion of FIG. 5 identified by reference letter e after counting predetermined VD periods.

When image-processing the still image, it is not possible to pass the entire data of one frame still image. Therefore, the still image processing is performed to each image area obtained by dividing the still image into the preset image areas within a time which is a non-processing time during which the moving image processing is not performed as shown in FIG. 5. The time approximately corresponds to retrace line period in the moving image frame period. Next, the still image data image-processed in the above description undergoes a JPEG image compression process sequentially in the image compression processing portion, which is the encode processing portion 10.

According to this embodiment, the moving image data undergoes the JPEG image compression process sequentially in encode processing portion 10 so as to be configured as a Motion-JPEG image. The moving image is stored in the storage unit 13 of FIGS. 1-13 for storing the sensed moving image described above or has its data passed to the network communication portion 12.

As for the still image, the divided image data is sequentially stored in the memory 8 once by the image processing portion 7. Then, the still image data is passed to the encode processing portion 10 so as to undergo the JPEG compression process after completely storing the data of one still image. When a block of the still image encoded in this case is 1 block, after receiving a moving image communication or storage finish command, it is delivered as one still image by the network communication portion 12 in the case of communication, or is recorded as one still image in the storage unit 13 in the case of storage. In the case where the encode processing portion 10 is capable of high-speed processing, however, it may be arranged to compress one still image in a non-compression processing time of a moving image after image-processing of one still image finishes, but not after receiving the moving image communication or a storage finish command.

In the case of receiving a still image capture command from outside again during a still image division processing (including a successive capture request) in the above description, still image capture operations are successively performed to the extent of not causing the captured image data to overflow the amounts of the memories 6 and 8.

In the second embodiment, the non-processing time other than the moving image processing time is shorter than the time described in the first embodiment. However, it is possible to have an entirely satisfactory processing time under this method when the image sizes of the moving image and still image are smaller.

As a first effect of realizing this embodiment as described above, it is possible, even when capturing the still image of a larger size than the moving image while taking the moving image, to deliver the moving image on the network or record the moving image without lowering the frame rate of the moving image at all.

As a second effect, successive capture of large still images while taking the moving image becomes possible within the amount of the entire pixel memory 6. That is, successive capture during continuous VDs becomes possible so as to obtain the images successively captured at the same speed as moving image frames.

As a third effect, it is not necessary to have multiple different image processing circuit blocks, one for the moving image and another for the still image, and so the control function can be realized with no need to increase the circuit scale on designing the circuits as an LSI.

As a fourth effect, it is possible to reduce the power consumption of the circuits by preventing an increase in the circuit scale.

As a fifth effect, it is possible to further improve the third and fourth effects because the buffer 18 is not necessary for a moving image.

Third Embodiment

Figure 6:
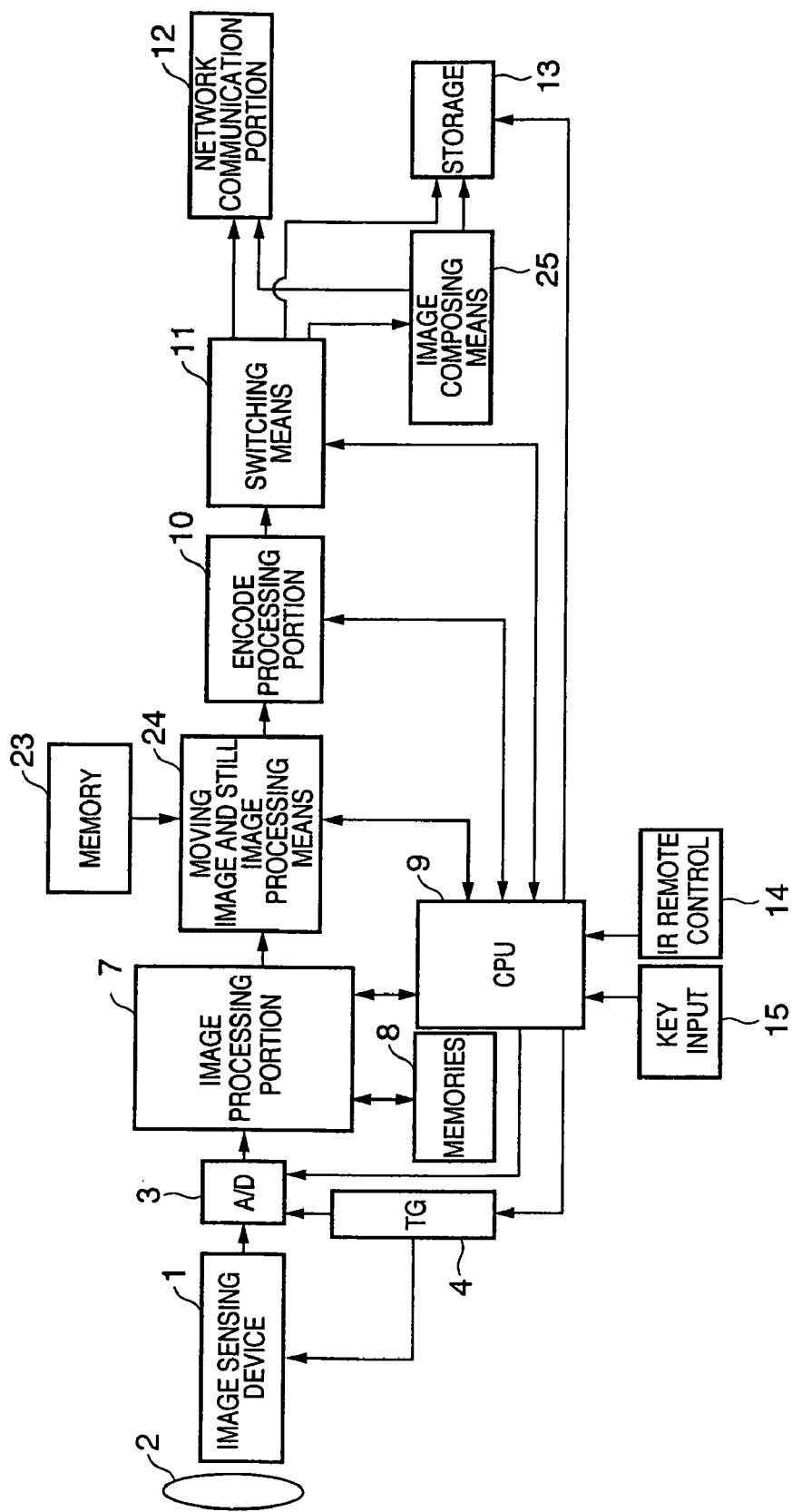
FIG. 6 is an overall configuration block diagram of an image sensing apparatus representing a third embodiment of the present invention.
Figure 7:
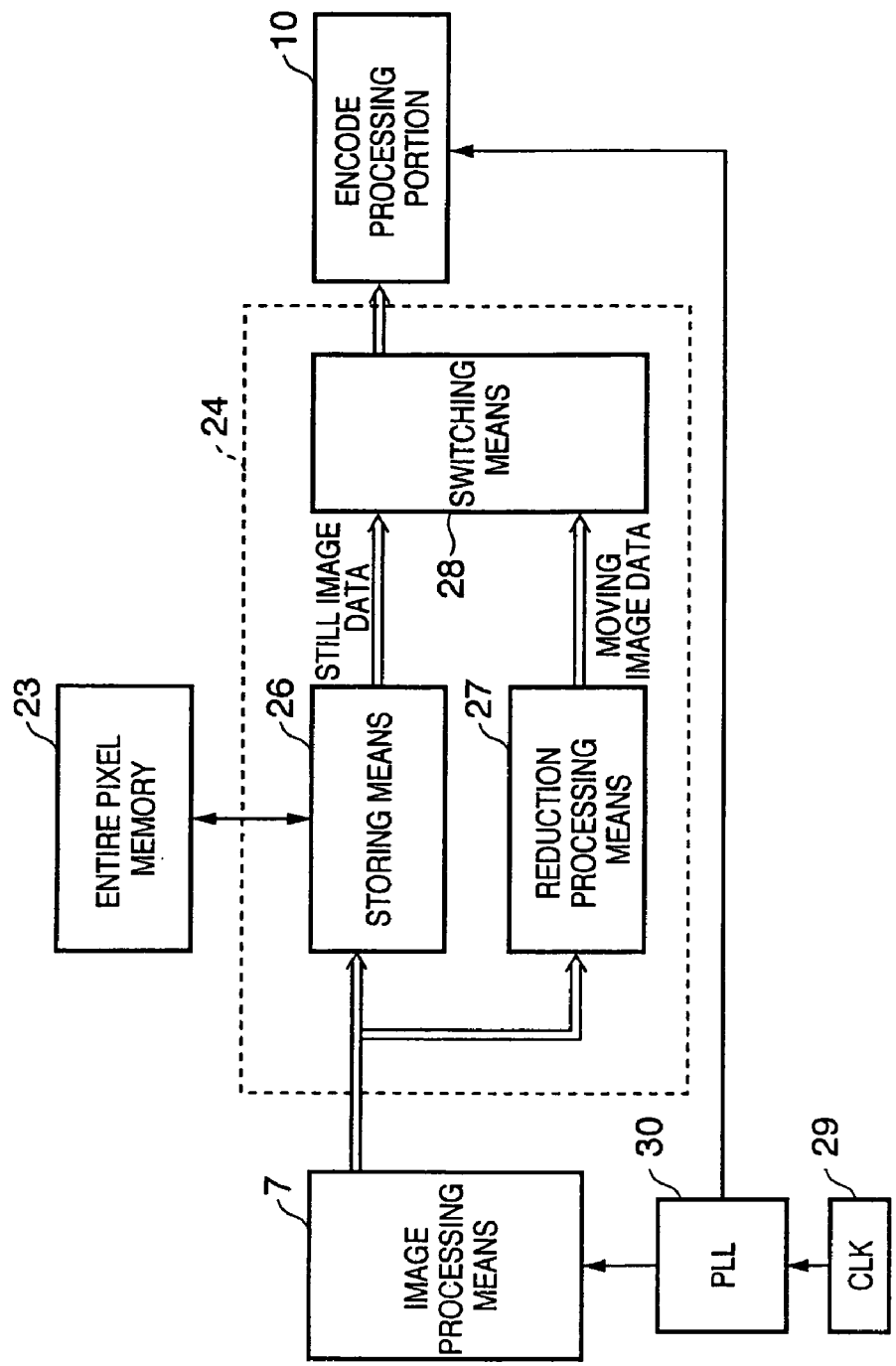
FIG. 7 is a configuration block diagram representing the third embodiment of the present invention.
Figure 8:
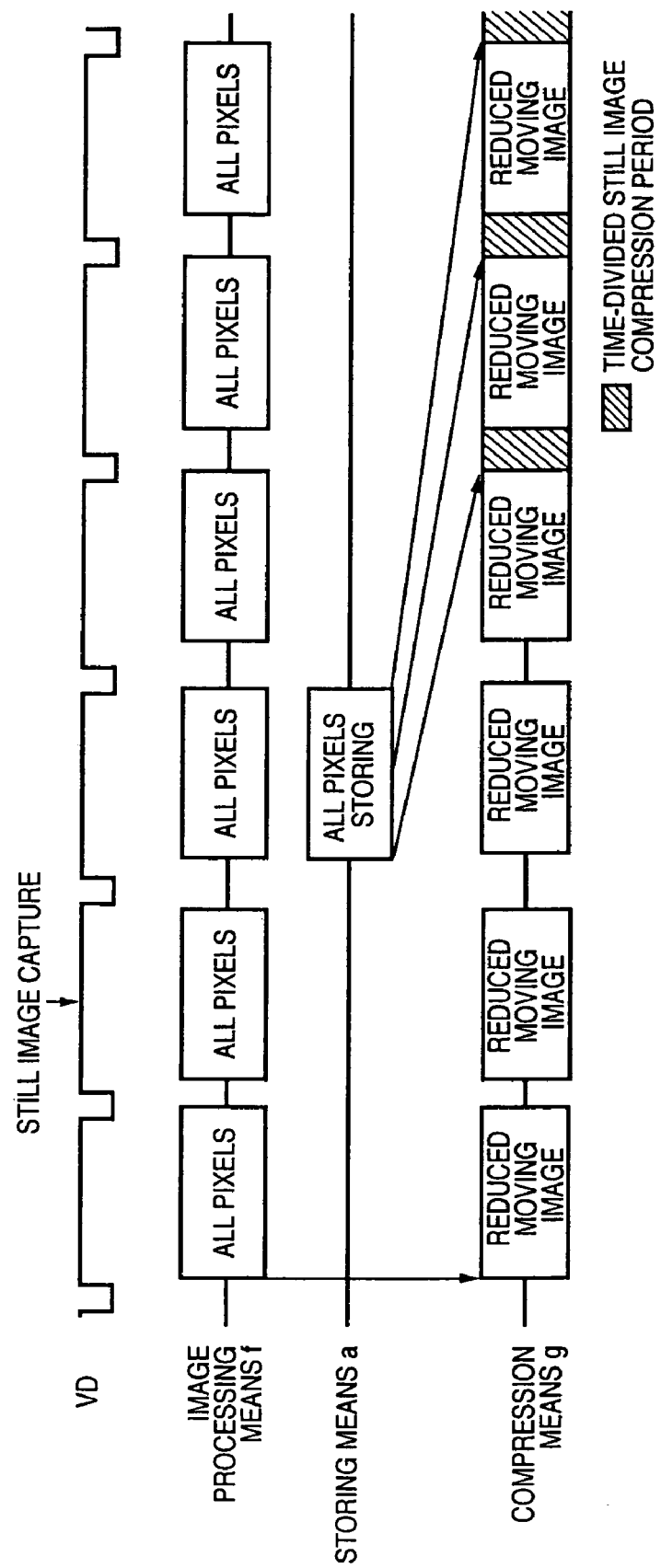
FIG. 8 is a diagram showing a timing chart representing the third embodiment of the present invention.

FIGS. 6, 7 and 8 are diagrams representing a third embodiment of the present invention. FIG. 6 is a block diagram showing an overview of this embodiment. FIG. 7 is a block diagram showing the characteristics relating to this embodiment. FIG. 8 is a timing chart of various processes representing the characteristics of this embodiment.

In FIG. 6, elements having the same functions as FIG. 1 are given the same numbers as those in FIG. 1. In FIG. 6, reference numeral 1 indicates an image sensing device which is a photoelectric conversion element. Though not particularly limited as the image sensing device, it represents an image sensing device, such as a CCD or a CMOS sensor, which is an image sensing device capable of reading out all the pixels within one frame period of a moving image according to this embodiment. Reference numeral 2 indicates a lens.

Reference numeral 3 indicates an AD conversion portion in control of AD conversion for digital-converting analog imaging data from the image sensing device 1 corresponding to a predetermined quantization bit. Reference numeral 4 indicates a timing generator for controlling the timing of the image sensing device 1 and the AD conversion portion 3. Reference numeral 7 indicates an image processing portion for performing a processing procedure on the image data AD converted by the AD conversion portion 3.

Reference numeral 8 indicates a memory for temporarily storing processed data and unprocessed data when processing the images in the image processing portion 7. This embodiment indicates the memory 8 to be an RAM, which is just an example, and it is not limited thereto if it is an element having an access speed of a sufficient level. Reference numeral 9 indicates a CPU as control means for controlling the system of this embodiment.

Reference numeral 10 indicates an encode processing portion for compressing the data processed by moving image and still image processing means 24 according to a predetermined format. As the image format is compliant with a standard such as JPEG or MPEG, this embodiment describes it as a JPEG encoder though it is not particularly limited thereto.

Reference numeral 11 indicates switching means for determining whether to record or communicate on the network the moving image data and still image data compressed by the encode processing portion 10. Reference numeral 12 indicates a network communication portion for communicating a communication command from an external network or delivering or communicating the moving image and still image processed in each of the processing portions to the outside.

Reference numeral 13 indicates a storage unit as storing means for storing the moving image data or still image data in the image sensing apparatus of this embodiment. While FIG. 1 describes it as the storage unit, here reference numeral 13 indicates a storage unit capable of data storage in general such as a nonvolatile memory, a medium or a hard disk capable of data writing, which may be replaceable and is not particularly limited. Reference numeral 14 indicates an infrared remote control receiving portion for receiving a remote control command from outside.

Reference numeral 15 indicates a key input portion directly operable by the user from outside. Reference numeral 23 indicates a memory which is image data storing means for storing still image frame image data divided by the moving image and still image processing means 24 described later. This memory 23 in this embodiment indicates an RAM, which is just an example, and it is not limited thereto if it is an element having an access speed of a sufficient level.

Reference numeral 24 indicates moving image and still image processing means for separating the image data processed by the image processing portion 7 into moving image signals and still image signals to reduce and/or buffer the images. Reference numeral 25 indicates image composing means for composing the image data (mainly still image data) switched by the switching means 11.

The configuration is configured by one chip when rendering as an LSI to include each of the blocks of the AD conversion portion 3, the timing generator 4, image processing portion 7, the CPU 9, the encode processing portion 10, the switching means 11, the moving image and still image processing means 24 and the image synthesizing means 25 of FIGS. 6-25. It is also possible, instead of rendering them as one-chip, to configure each of the processing blocks separately or render them as an LSI configuration which is convenient for implementation of the devices.

Next, FIG. 7 is a block diagram for describing this embodiment in detail.

In FIG. 7, reference numeral 7 indicates an image processing means for performing a processing procedure of the image data AD converted by the AD conversion portion 3 as in FIG. 6. Reference numeral 23 indicates a memory, which is the image data storing means for storing the still image frame image data stored in the storing means 26 described later. In this embodiment, memory 23 can be an RAM, which is just an example, and it is not limited thereto if it is an element having an access speed of a sufficient level.

Reference numeral 26 indicates storing means for storing the image processing data processed by the image processing means 7 corresponding to the entire pixel data during 1 VD frame period as the still image data, when capturing the still image in response to external control command input. Reference numeral 27 indicates reduction processing means for reducing the image-processed data corresponding to the entire pixel data of the image sensing device 1 to the image size of the moving image.

Reference numeral 28 indicates switching means for switching the image compression process of the moving image and the still image in response to control from the CPU 9, which is the control means. Reference numeral 29 indicates a transmitter for generating a clock necessary for operation of this system. Reference numeral 30 indicates a PLL circuit for multiplying the frequency of the transmitter 29 to set it at a fast frequency.

A description will be provided by using the timing chart of FIG. 8 as to the processing flow in the configuration of FIGS. 6 and 7.

In descending vertical order of the signals and processes of FIG. 8, VD indicates a vertical synchronizing signal for configuring the moving image, reference character f indicates a timing for being image-processed in the image processing portion 7, reference character a indicates a timing for storing and storing the data in the entire pixel memory 23 and the storing means 26 for storing the still image, and reference character g indicates a timing for reducing the image data processed in the image processing portion 7 by the reduction processing means 27.

(Moving Image Sensing Period)

First, in a data flow upon sensing the moving image normally, the period up to the point described by a downward arrow as the still image capture in FIG. 8 represents a moving image sensing period. The timing between a VD signal and a next VD signal represents a unit frame period of the moving image. The control means, via timing generator 4, controls the image sensing device 1 to be ready for reading out all the pixels to start reading out the imaging data corresponding to all the pixels.

Next, to perform the moving image processing shown in the portion of FIG. 8 identified by reference letter f, the data digitized by the AD conversion portion 3 of all the pixels is sequentially image-processed by the image processing portion 7 in the order of the pieces of the data read out according to the timing of the timing generator 4. The contents to be image-processed indicate the normal processing procedure, which performs a filtering process of the image and a luminance correction process, a color difference correction process, and the like thereof to create an optimal image. Since details of these processing operations are heretofore known, and are different depending on the points of view of manufacturers and the like relating to the images, a description thereof will be omitted.

As the image processing portion 7 performs various kinds of image processing operations, the memory 8 temporarily buffers the image data that undergoes various kinds of image processing operations sequentially in chronological order by the image processing portion 7, and passes and receives the data to and from the image processing portion 7. As memory access and the like of the image processing portion 7 is a technique heretofore known, a description thereof will be omitted.

Next, the image of the image data, processed correspondingly to all the pixels by the image processing portion 7 and having undergone an image reduction process by the reduction processing means 27, is configured for the moving image. The switching means 28 selects the moving image. The encode processing portion 10 has the reduced moving image reduced by the reduction processing means 27 in the timing shown in the portion of FIG. 8 identified by the reference character g sequentially compressed in the JPEG format as a preset and a predetermined image format. The switching means 11 determines whether to store the compressed data in the storage unit 13 inside the image sensing apparatus or to communicate the compressed data to an external destination via the network communication portion 12.

As the image sensing apparatus is in such a state, the CPU 9 operates in response to a control instruction from outside to be in the moving image sensing mode. The destination of the moving image data is set to correspond to a control command controlled from outside in advance, and is in a state of either communicating the moving image to external devices via the network communication portion 12 or storing the moving image data sequentially in the storage unit 13.

(Capture Still Image)

A description will be provided as to the case where the CPU 9 receives a command for requesting a capture of a still image of a size larger than the image size configuring the moving image from any one of the network communication portion 12, the infrared remote control receiving portion 14 and the key input portion 15 during the aforementioned moving image sensing.

In the case of receiving the command at the point described as the still image capture shown in FIG. 8, the storing means 26 stores them from a first VD (vertical synchronizing signal) after receiving the capture command in the order of undergoing the image processing in the image processing portion 7 and stores them sequentially in the entire pixel memory 23 as the storing means until the image processing is completed. At the same time, the images reduced by the reduction processing means 27 are sequentially compressed to JPEG images by the encode processing portion 10 in a timing of the compression means shown in the portion of FIG. 8 identified by reference letter g.

The data stored for the still image in the memory 23 is passed to the encode processing portion 10 to perform the image compression processing in the non-compression processing periods other than the moving image compression processing period as shown in blanks in the portion of FIG. 8 identified by reference letter g after counting a predetermined VD period. When image-processing the still image, the compression processing of the still image is performed on each portion of the image divided to correspond to the preset image areas by dividing the image data of one image into periods approximately corresponding to the retrace line periods of the moving image frame unit period which is a non-processing period during which the moving image processing operation is not performed as shown in FIG. 8.

According to this embodiment, the moving image data undergoes the JPEG image compression process sequentially in the image compression processing portion, which is the encode processing portion 10, so as to be configured as a Motion-JPEG image. The moving image is stored in the storage unit 13 for storing the sensed moving image described above or has its data passed to the network communication portion 12.

As for the still image, the compressed and divided image data is completely synthesized as the image data of one image by the image synthesizing means 25. Thereafter, it is delivered as one still image by the network communication portion 12 in the case of communication, or is recorded as one still image in the storage unit 13 in the case of the storage.

Here, the image data of the still image compressed by the encode processing portion 10 is synthesized as one image so as to be delivered to the network or recorded in the storage unit. It is also possible, however, to deliver the compressed and divided image in an as-is divided state to the network or record it in the storage unit.

In the case of receiving a still image capture command from outside again during the still image division processing period (including a continuous sensing request) in the description of this embodiment, a still image capture operation is continuously performed in sequence to the extent of not causing the amount of the entire pixel memory 23 to overflow.

As the first effect of realizing this embodiment as described above as with the first embodiment, it is possible, when capturing the still image of a larger size than the moving image while taking the moving image, to deliver it on the network or record it without lowering the frame rate of the moving image at all.

As the second effect, continuous sensing of large-screen still images while taking the moving image becomes possible within the amount of the entire pixel memory 6 (continuous sensing by VD becomes possible so as to obtain the images continuously shot at the same speed as the moving image frames).

As the third effect, it is not necessary to have multiple image processing circuit blocks, and so the control can be realized with no need to increase the circuit scale on rendering it as an LSI.

As the fourth effect, it is possible to reduce the power consumption of the circuits by preventing an increase in the circuit scale.

As the fifth effect, it is possible to further promote the third and fourth effects because a reduced image buffer is not necessary for moving image configuration.

Fourth Embodiment

Figure 9:
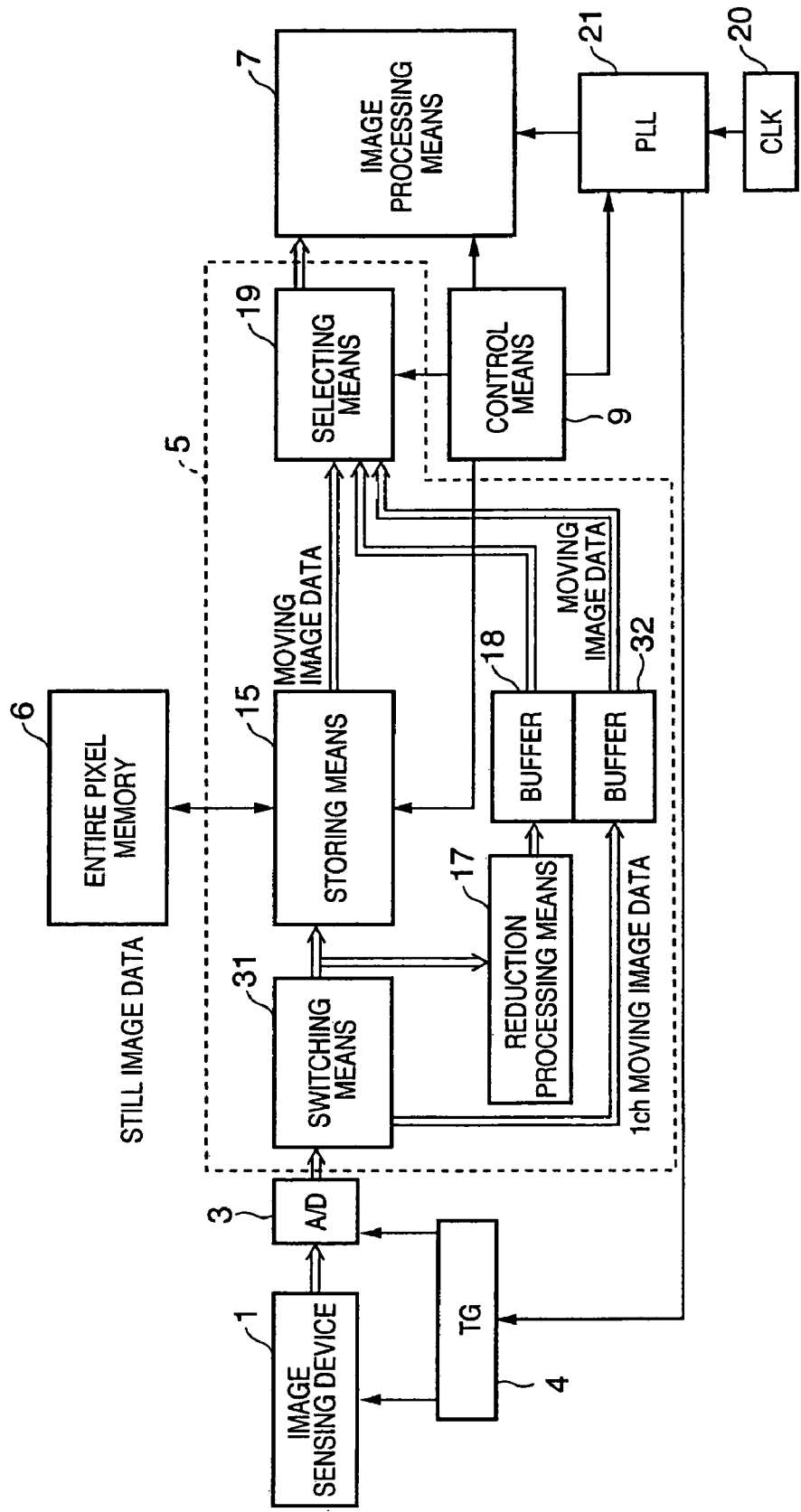
FIG. 9 is a configuration block diagram representing the fourth embodiment of the present invention.
Figure 10:
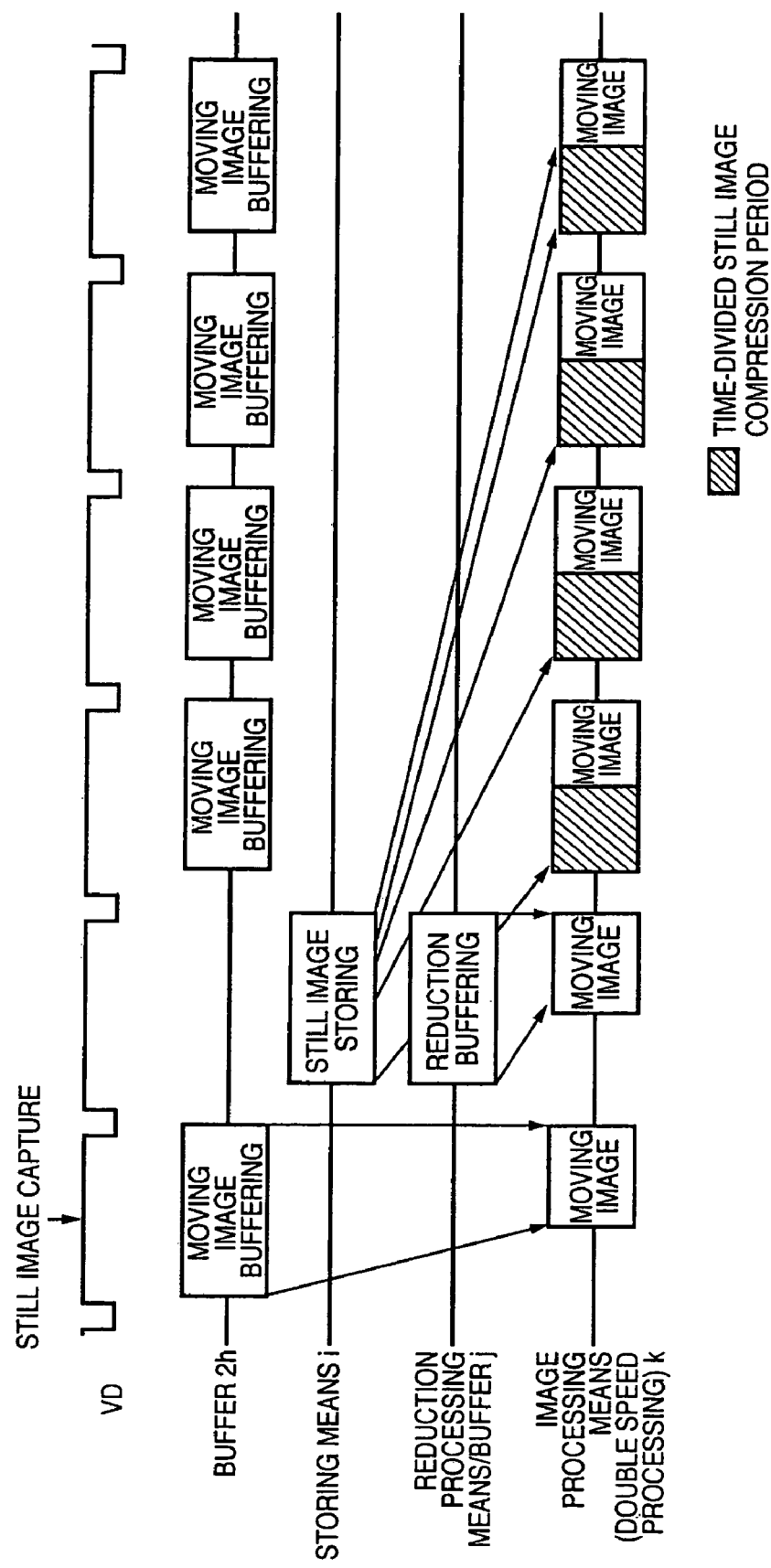
FIG. 10 is a diagram showing a timing chart representing the fourth embodiment of the present invention.

FIGS. 1, 9 and 10 are diagrams representing a fourth embodiment of the present invention. A block diagram showing an image sensing apparatus of the second embodiment is the same configuration as that described in FIG. 1 of the first embodiment. FIG. 9 is a block diagram showing the characteristics relating to this embodiment. FIG. 10 is a timing chart of various processes representing the characteristics of this embodiment. Here, the description of FIG. 1 will be omitted.

FIG. 9 is a block diagram for describing the blocks described as reference numerals 1 to 9 of FIG. 1 in detail, where reference numerals 1, 3, 4, 6, 7 and 9 of FIG. 9 correspond to the aforementioned reference numerals 1, 3, 4, 6, 7 and 9 of FIG. 1. The structure surrounded by a dot line in FIG. 9 corresponds to the moving image and still image processing means 5 of FIG. 1.

Reference numeral 17 of FIG. 9 indicates reduction processing means for reducing the image data corresponding to all the pixels read out by the still image readout channel to the image size of the moving image. Reference numeral 15 indicates storing means for storing the entire pixel readout data corresponding to the still image mode of the image sensing device 1.

Reference numeral 18 indicates a buffer memory for holding the reduced image data from the reduction processing means 17 for a predetermined period and buffering the data. Reference numeral 19 indicates selecting means for selecting image processing of the moving image and the still image in response to control from the CPU 9 as control means. Reference numeral 20 indicates a transmitter for generating a clock necessary for operation of this system. Reference numeral 21 indicates a PLL circuit for multiplying a frequency of the transmitter 20 to set it at a fast frequency.

Reference numeral 31 indicates switching means for switching a flow of a data processing block of the imaging data AD converted by the AD conversion portion 3 to correspond to readouts of the moving image readout channel and the still image readout channel. Reference numeral 32 indicates a buffer for buffering the image read out in a moving image readout mode by the switching means 31.

As for the configurations of FIGS. 1 and 9, the flow of processing will be described by referring to the timing chart shown in FIG. 10.

In descending vertical order of the signals and processes of FIG. 10, VD indicates a vertical synchronizing signal for configuring the moving image, reference character h indicates a buffering operation timing of the moving image data read out of a normal moving image readout channel by the buffer 32, reference character i indicates a timing for storing and storing the data in the entire pixel memory 6 and storing means 16 for storing the still image, reference character j indicates a buffering operation timing of the reduction process for creating an image configuring the moving image with the reduction processing means 17 and buffer 18 and the reduced data, and reference character k indicates a timing for performing the image processing with the image processing portion 7.

(Moving Image Sensing Period)

First, in a data flow upon sensing the moving image normally, the period up to the point described by a downward arrow as the still image capture in FIG. 9 represents a moving image sensing period. The timing between a VD signal and a next VD signal represents a unit frame period of the moving image. The control means 9 controls the timing generator 4 to start reading out pixel imaging data corresponding to the moving image size, in the moving image readout channel setup.

Next, the data is inputted to the switching means 31 in the order of the pieces of the data digitized by the AD conversion portion 3 read out according to the timing of the timing generator 4. The switching means 31 is switched to the moving image mode on sensing the moving image normally.

The image data for the moving image temporarily buffered in the buffer memory 32 has its moving image selected by the selecting means 19. After the elapse of a predetermined time from the start of moving image buffering shown in the portion of FIG. 10 identified by reference letter h, the moving image processing shown in the portion of FIG. 10 identified by reference letter k is sequentially performed to the moving images by the image processing means 7. In this case, as the moving image processing starting time is delayed by the predetermined time, the moving image processing is set in a time period not to overtake the data buffered in the buffer 32 so as to perform the moving image processing at a high speed to the extent of keeping it within a moving image frame. In this case, a high-speed clock is supplied by the PLL circuit 21 to have high-speed processing realized by the image processing portion 7.

The contents to be image-processed in the description indicate a normal processing procedure, which performs a filtering process of the image and a luminance correction process, a color difference correction process, and the like thereof to create an optimal image. As details of the processing contents are techniques heretofore known, and are different depending on the points of view of manufacturers and the like relating to the images and so a description thereof will be omitted. As the image processing portion 7 performs various kinds of image processing operations, the memory 8 temporarily buffers the image data that undergoes various the kinds of image processing operations sequentially in chronological order by the image processing portion 7, and passes and receives the data to and from the image processing portion 7. As memory access and the like of the image processing portion is a technique heretofore known, a description thereof will be omitted.

Next, the data having completed the image processing operations is configured as one image within a frame period which is 1 VD period, and the data is passed to the encode processing portion 10, which is the next processing block. The encode processing portion 10 compresses the image-processed data in the JPEG format as a preset and predetermined image format, and the data is stored in the storage unit inside the image sensing apparatus by the switching means 11 or communicated to an external destination via the network communication portion 12.

As the image sensing apparatus is in such a state, the CPU 9 operates in response to a control instruction from outside to be in the moving image sensing mode. The destination of the moving image data is set correspondingly to a control command controlled from outside in advance, and is in a state of either communicating the moving image to the external devices via the network communication portion 12 or storing the moving image data sequentially in the storage unit 13.

(Capture Still Image)

A description will be provided as to the case where the CPU 9 receives a command for requesting a capture of a still image of a size larger than the image size configuring the moving image from any one of the network communication portion 12, the infrared remote control receiving portion 14 and the key input portion during the aforementioned moving image sensing.

In the case of receiving the command at the point described as the still image capture shown in FIG. 10, the image sensing device 1 is switched to readout of the entire pixel readout channel for dealing with the still image readout starting from the first VD (vertical synchronizing signal) after receiving the capture command. The switching is implemented by switching the readout timing of the timing generator 4. At the same time, the data is passed to the storing means 16 and the reduction processing means 17 for the sake of the still image readout by the switching means 31. This frame is set as a still image data storage frame, which starts storing the output signals from the AD conversion portion 3 in the storing means 16 in readout order, and stores them sequentially in the memory 6 as the storing means until the readout is completed.

At the same time, the reduction and buffering of the image of the same size as the moving image channel read out in a previous VD period by the above described reduction processing means 17 and the buffer 18 are processed in parallel. An image having the still image reduced is used for the moving image data in 1 VD frame period following receipt of a capture control signal.

Thereafter, it is switched from an immediate VD frame to the above described moving image mode readout channel to perform the moving image processing sequentially in the image processing portion 7. Still image storage data stored as the still image data in the memory 6 is passed to the image processing portion 7 to perform the image processing in periods other than a moving image processing period after counting predetermined VD periods (that is, including a next count) as shown in blanks in the portion of FIG. 9 identified by reference letter k.

When image-processing the still image not to influence the moving image processing time in the same image processing portion, it is not possible to perform data processing of the entire data of one still image of a size larger than the moving image. Therefore, the still image is processed by having each portion of the image divided to correspond to the preset image areas divided over non-processing periods not performing the moving image processing as shown in FIG. 3.

According to this embodiment, the moving image read out by the moving image read out channel has a VGA size (640× 480) while the still image read out by the still image read out channel is represented in a still image size (size corresponding to all the pixels) of 1280×960 which is twice as large vertically and horizontally. In the case, a number of division is four. In another case of the still image size corresponding to a larger image size for instance, the number of divided areas is increased and the still image is processed as described above. In the case of the image size being twice as large vertically and horizontally as 1280×960, for instance, the still image is processed by dividing it into 16 pieces. However, this is just an example, and the number of divisions is set up according to the still image size and the moving image size.

The moving image data then undergoes a JPEG image compression process sequentially in the image compression processing portion which is the encode processing portion 10 so as to be configured as a Motion-JPEG image. After the compression process, the moving image is stored in the storage unit 13 for storing the moving image sensing described above or has its data passed to the network communication portion 12.

As for the still image, the divided image data is sequentially stored in the memory 8 once by the image processing portion 7, and is passed to the encode processing portion 10 as the still image after completely storing the image data of one image so as to undergo the JPEG compression process. When an encode processing block of the still image in this case is 1 block, after receiving a moving image communication or storage finish command, it is delivered as one still image by the network communication portion 12 in the case of communication, or is recorded as one still image in the storage in the case of the storage. In the case where the encode processing portion 10 is a block capable of high-speed processing, however, it may be arranged to compress one image in a non-compression processing period of a moving image compression process after image-processing one image without performing the storage or network delivery after receiving the storage command.

In the case of receiving a still image capture command from outside again during a still image division processing period (including a continuous sensing request) in the above description, a still image capture operation is continuously performed to the extent of not causing the amounts of the memories 6 and 8 to overflow.

As the first effect of realizing this embodiment as described above as with the first embodiment, it is possible, when capturing the still image of a larger size than the moving image while taking the moving image, to deliver it on the network or record it without lowering the frame rate of the moving image at all.

As the second effect, continuous sensing of large-screen still images while taking the moving image becomes possible within the amount of the entire pixel memory 6. That is, continuous sensing by VD becomes possible so as to obtain the images continuously shot at the same speed as moving image frames.

As the third effect, it is not necessary to have multiple image processing circuit blocks, and so the control can be realized with no need to increase the circuit scale on rendering it as an LSI.

As the fourth effect, it is possible to reduce the power consumption of the circuits by preventing an increase in the circuit scale.

As the fifth effect, it is possible to save electric power on processing the moving image because a period for reducing the still image for the sake of configuring the moving image is limited to a VD period in which all the pixels of the still image are being read out.

Fifth Embodiment

Figure 11:
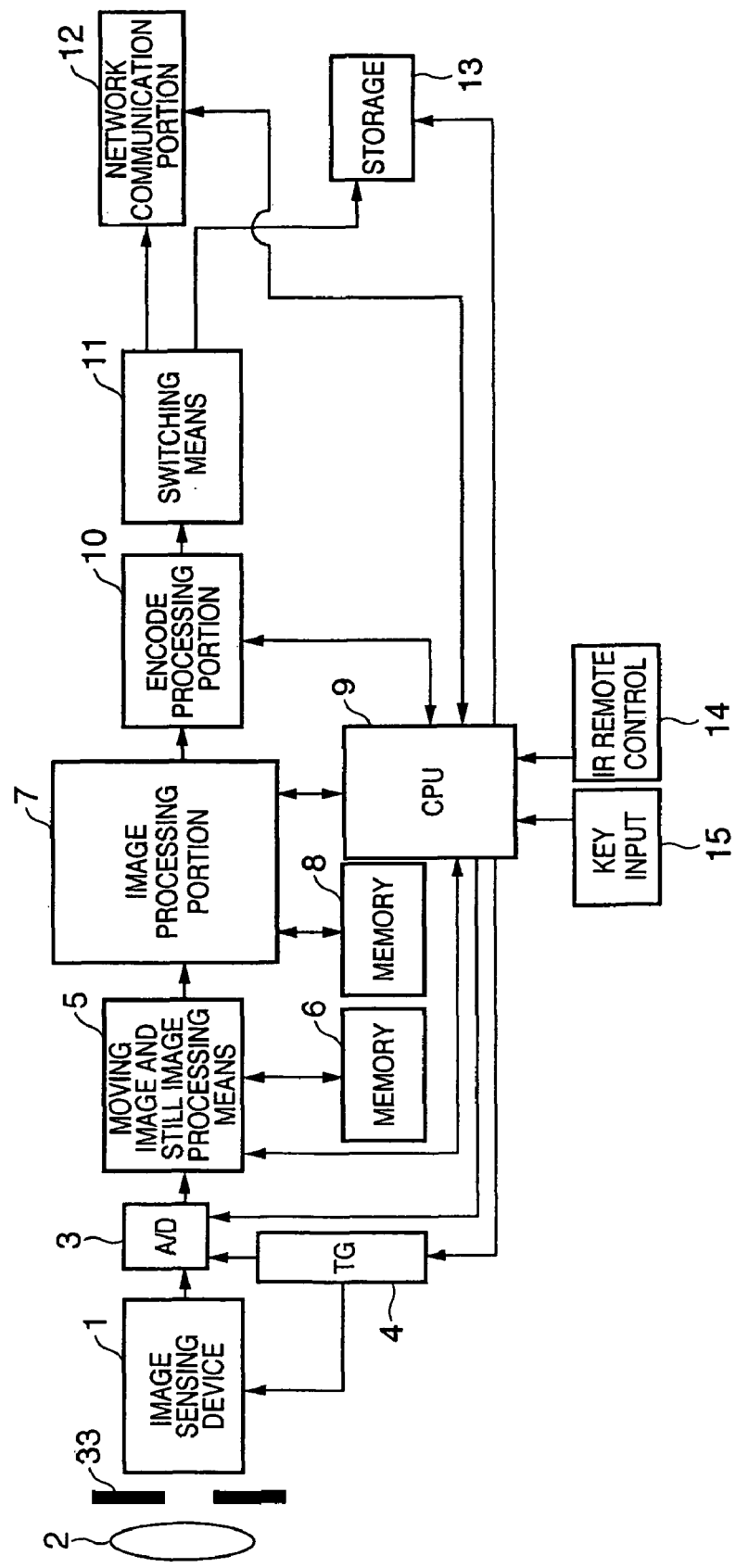
FIG. 11 is an overall configuration block diagram of an image sensing apparatus representing fifth and sixth embodiments of the present invention.
Figure 12:
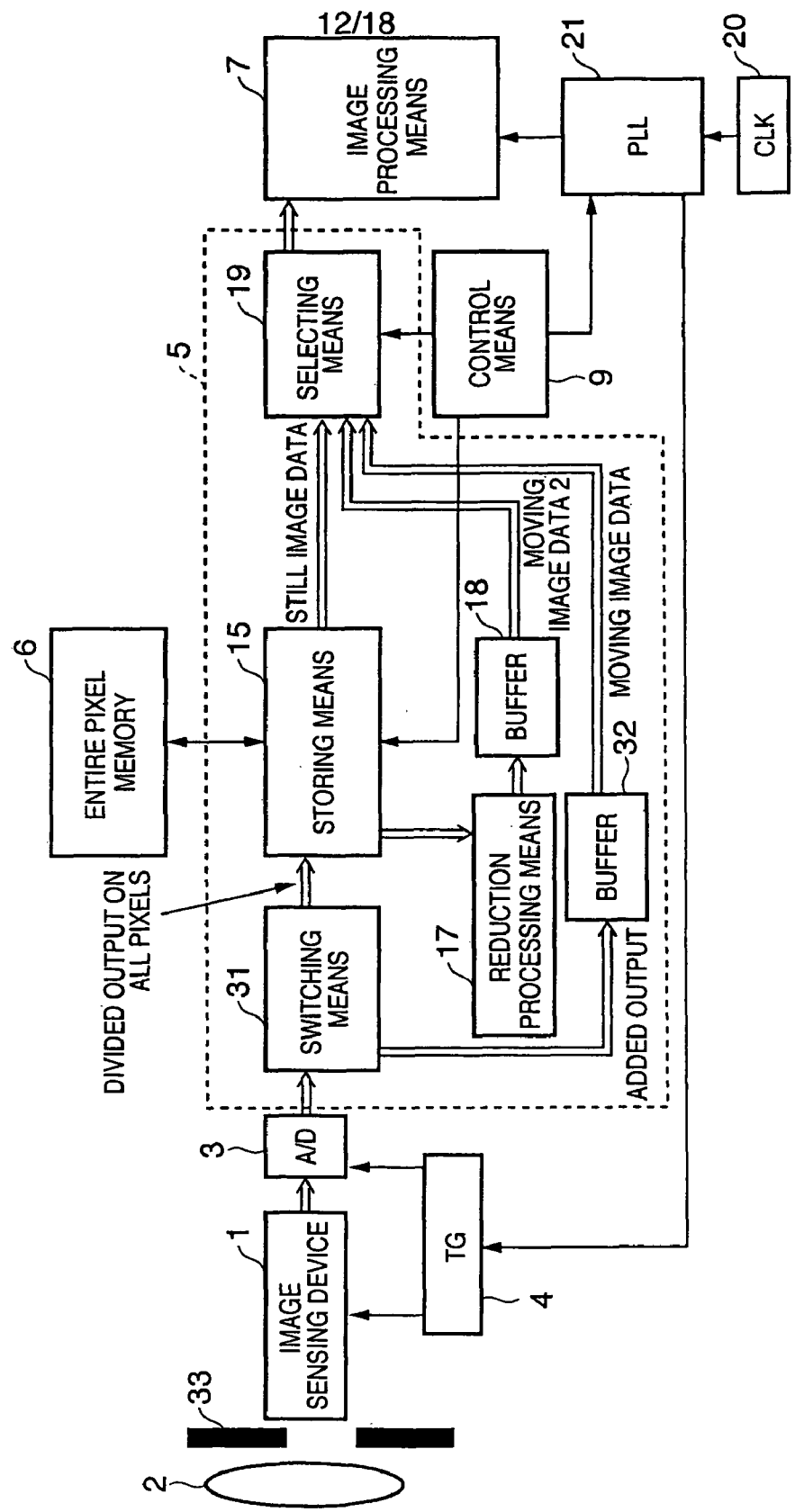
FIG. 12 is a configuration block diagram representing the fifth and sixth embodiments of the present invention.
Figure 13:
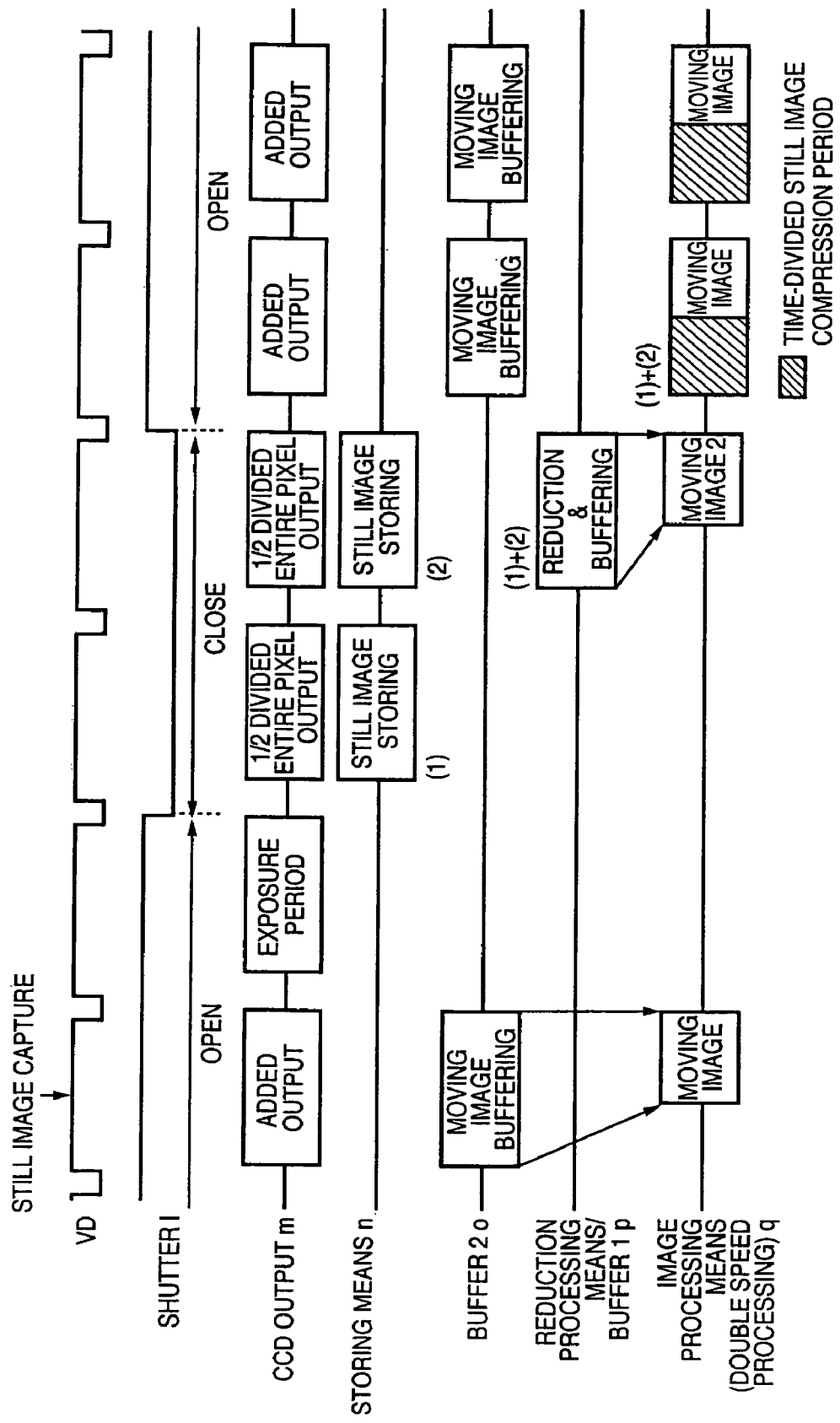
FIG. 13 is a diagram showing a timing chart representing the fifth embodiment of the present invention.

FIGS. 11, 12 and 13 are diagrams representing a fifth embodiment of the present invention. FIG. 11 is a block diagram representing an overview of the image sensing apparatus of the present invention. FIG. 12 is a block diagram showing the characteristics relating to this embodiment. FIG. 13 is a timing chart of various processes representing the characteristics of this embodiment.

In configuration order of FIG. 11, reference numeral 1 indicates an image sensing device, which is a photoelectric conversion element. Though not particularly limited as the image sensing device, it represents an image sensing device, such as a CCD or a CMOS sensor. The image sensing device has a moving image readout channel for dealing with the moving image and a still image readout channel for dealing with the still image readout according to this embodiment. The moving image readout channel is a channel capable of reading the data having undergone pixel skipping or having the pixels added correspondingly to the moving image size out of the entire pixel data. The still image readout channel is a channel requiring an exposure period for the still image and is capable of reading the data of all the pixels in multiple frame periods of the moving image, which are periods different from the exposure period. It is an image sensing device capable of reading all the pixels in 2 frame periods with a sensor of 3 to 4 million pixels or so.

The configuration of the elements denoted by reference numerals 2 to 15 of FIG. 11 corresponds to the configuration of the elements denoted by reference numerals 2 to 15 of FIG. 1 according to the first embodiment. Reference numeral 33 indicates a mechanical shutter for physically shutting out external light during a sensor readout period of the image sensing device 1.

The configuration is configured by one chip when rendering as an LSI to include each of the blocks of the AD conversion portion 3, the timing generator 4, the moving image and still image processing means 5, the image processing portion 7, the CPU 9, the encode processing portion 10 and the switching means 11. It is also possible, instead of rendering them as one-chip, to configure each of the processing blocks separately or render them as an LSI configuration, which is convenient for implementation of the devices.

Next, FIG. 12 is a block diagram for describing the blocks described as reference numerals 1 to 9 of FIG. 11 in detail, where reference numerals 1, 3, 4, 6, 7 and 9 of FIG. 12 correspond to the aforementioned reference numerals 1, 3, 4, 6, 7 and 9 of FIG. 1. The structure surrounded by a dot line in FIG. 12 corresponds to the moving image and still image processing means 5 of FIG. 11.

Reference numeral 17 indicates reduction processing means for reducing the image data corresponding to all the pixels read out by the still image readout channel to the image size of the moving image. Reference numeral 15 indicates storing means for storing the entire pixel readout data corresponding to the still image mode of the image sensing device 1.

Reference numeral 18 indicates a buffer memory for holding the reduced image data from the reduction processing means 17 for a predetermined period and buffering the data. Reference numeral 19 indicates selecting means for selecting image processing of the moving image and the still image in response to control from the CPU 9 as control means. Reference numeral 20 indicates a transmitter for generating a clock necessary for operation of this system, and reference numeral 21 indicates a PLL circuit for multiplying a frequency of the transmitter 20 to set it at a fast frequency.

Reference numeral 31 indicates switching means for switching a flow of a data processing block of the imaging data AD converted by the AD conversion portion 3 to correspond to readouts of the moving image readout channel and the still image readout channel. Reference numeral 32 indicates a buffer memory for buffering the image read out in a moving image channel readout mode by the switching means 31.

Reference numeral 33 corresponds to reference numeral 33 of FIG. 11, and indicates a mechanical shutter for physically shutting out external light during a sensor readout period of the image sensing device 1. A description will be provided by using the timing chart shown in FIG. 13 as to the processing flow in the configuration of FIGS. 11 and 12.

In descending vertical order of the signals and processes of FIG. 13, VD indicates a vertical synchronizing signal for configuring the moving image, reference character l indicates a timing for opening and closing the mechanical shutter 33, reference character m indicates a timing representing a readout mode of the CCD of the image sensing device 1, reference character n indicates a timing for storing and storing the data in the entire pixel memory 6 and storing means 16 for storing the still image, reference character o indicates a buffering operation timing of the moving image data read out of a normal moving image readout channel by the buffer memory 32, reference character p indicates a buffering operation timing of the reduction process for creating an image configuring the moving image from the still image data read out of the still image readout channel of the CCD with the reduction processing means 17 and the buffer 18 and the reduced data, and reference character q indicates a timing for performing the image processing with the image processing portion 7.

(Moving Image Sensing Period)

First, in a data flow on sensing the moving image normally, the period up to the arrow portion below the point described as the still image capture in FIG. 13 represents a moving image sensing period, and the timing between a VD signal and a next VD signal represents a unit frame period configuring the moving image. The timing generator 4 of FIGS. 12-4 is controlled in the moving image readout channel setup with the mechanical shutter 33 open so as to start reading out pixel imaging data corresponding to the moving image size.

Next, the data is inputted to the switching means 31 in the order of the pieces of the data digitized by the AD conversion portion 3 read out according to the timing of the timing generator 4. The switching means 31 is switched to the moving image mode on sensing the moving image normally.

The image data for the moving image temporarily buffered in the buffer memory 32 has its moving image selected by the selecting means 19. After the elapse of a predetermined time from the start of moving image buffering in the portion of FIG. 13 identified by reference letter o, the moving image processing shown in the portion of FIG. 13 identified by reference letter q is sequentially performed by image processing means 7. In this case, as the moving image processing starting time is delayed by the predetermined time, the moving image processing is set in a time period not to overtake the data buffered in the buffer 32 so as to perform the moving image processing at a high speed to the extent of keeping it within a moving image frame. In this case, a high-speed clock is supplied by the PLL circuit 21 to have high-speed processing realized by the image processing portion 7.

The contents to be image-processed in the description indicate a normal processing procedure, which performs a filtering process of the image and a luminance correction process, a color difference correction process, and the like thereof to create an optimal image. As details of the processing operations are techniques heretofore known, and are different depending on the points of view of manufacturers and the like relating to the images, a description thereof will be omitted.

As the image processing portion 7 performs various kinds of image processing, the memory 8 temporarily buffers the image data undergoing various kinds of image processing operations sequentially in chronological order by the image processing portion 7, and passes and receives the data to and from the image processing portion 7. As memory access and the like of the image processing portion is a technique heretofore known, a description thereof will be omitted.

Next, the data having completed the image processing operations is configured as one image within a frame period which is 1 VD period, and the data is passed to the encode processing portion 10, which is the next processing block. The encode processing portion 10 compresses the image-processed data in the JPEG format as a preset and predetermined image format, and the data is stored in the storage unit 13 inside the image sensing apparatus by the switching means 11 or communicated to an external destination via the network communication portion 12.

As the image sensing apparatus is in such a state, the CPU 9 operates in response to a control instruction from outside to be in the moving image sensing mode. The destination of the moving image data is set to correspond to a control command controlled from outside in advance, and is in a state of either communicating the moving image to the external devices via the network communication portion 12 or storing the moving image data sequentially in the storage unit 13.

(Capture Still Image)

A description will be provided as to the case where the CPU 9 receives a command for requesting a capture of a still image of a size larger than the image size of the moving image from any one of the network communication portion 12, the infrared remote control receiving portion 14 and the key input portion 15 during the aforementioned moving image sensing operation.

In the case of receiving the command at the point described as the still image capture shown in FIG. 13, the CCD as the image sensing device 1 is set to an entire pixel exposure period for dealing with the still image readout over the first VD (vertical synchronizing signal) period after receiving the capture command. The mechanical shutter 33 remains open during that period as shown in the portion of FIG. 13 identified by reference letter l, and no data is passed to the other processing circuit blocks during the exposure period of the CCD.

The CCD as the image sensing device 1 can read out the image data in response to the next VD frame signal. Here, the mechanical shutter 33 opened during the exposure period is closed in synchronization with the VD signal. It starts reading out the data exposed for 1 VD period from a time point when a ½ image of the image data corresponding to the still image is synchronized with the VD signal of the part of (1) described in FIG. 13, and has the data sequentially stored by the storing means 15 in the memory 6. The pixel data of the remaining ½ portion is read out in the VD period of the part of (2) described in FIG. 13, and is stored by the storing means 15 in the memory 6 as with the above described ½ pixels.

In the portion of FIG. 13 identified by reference letter p, the image is reduced by the reduction processing means 17 and the reduced image is temporarily buffered by the buffer 18 in parallel with the still image processing operation as from the time point indicated by (1)+(2) so as to configure the processed image for the moving image.

The image data for the moving image temporarily buffered by the buffer 18 has its moving image selected by the selecting means 19. After the elapse of a predetermined time from the start of moving image buffering in the portion of FIG. 13 identified by reference letter b, the moving image processing shown in the portion of FIG. 13 identified by reference letter q is sequentially performed by image processing means 7. In this case, as the moving image processing starting time is delayed by the predetermined time, the moving image processing is set in a time period not to overtake the data buffered in the buffer 18 so as to perform the moving image processing at a high speed to an extent of keeping it within a moving image frame.

Thereafter, the mechanical shutter 33 is opened in synchronization with immediate VD signal timing. At the same time, a switch is made from the VD frame to the above described moving image mode readout channel so as to perform the moving image processing sequentially in the image processing portion 7.

Still image storage data stored as the still image data in the memory 6 is passed to the image processing portion 7 to perform the image processing in periods other than the moving image processing period after counting a predetermined VD period (that is, including a next count) as shown in blanks in the portion of FIG. 13 identified by reference letter q.

When image-processing the still image not to influence the moving image processing time in the same image processing portion, it is not possible to perform data processing of the entire data of one still image of a size larger than the moving image. Therefore, the still image is processed by having each portion of the image divided to correspond to the preset image areas divided over non-processing periods not performing the moving image processing as shown in FIG. 13.

Here, a description will be provided as to the mode for reading out all the pixels corresponding to the still image by exemplifying the case of the CCD of a primary-color filter and RGB pixel arrays of a Bayer array interlace readout method. When reading out the still image, it is arranged to sequentially read out R, Gr, R, Gr . . . which are signal components of pixel odd-numbered lines in a first field and Gb, B, Gb, B . . . which are signal components of pixel even-numbered lines in a second field.

As the image of only the first field is read in 1 VD period of the moving image frame period and the remaining image of the second field is read in the following VD period, only the R component and Gr component can be read in the 1 VD period. Therefore, it is arranged to move on to the next process after referring to the data after sequentially reading out Gb, B, Gb, B . . . from the start of readout of the second field and the data stored in the memory 6.

The processing flow and processing timing of each of the blocks 10 to 13 of FIG. 11 from the image processing portion 7 onward correspond to the processing contents of the blocks 10 to 13 of FIG. 1 according to the first embodiment so as to perform exactly the same process.

According to this embodiment, the frame configuring the moving image during a CCD exposure period and the first frame period on reading out the CCD are in a state not capable of updating the image data so that the moving image blacks out only in these periods. In the moving image blackout period, the images in the period immediately before the CCD exposure frame period are sequentially rendered as the moving images.

As the first effect of realizing this embodiment as described above, it is possible, when capturing the still image while taking the moving image with the image sensing device 1 requiring the mechanical shutter 33, to reduce the frames blacking out as the moving image so as to provide the image with little discomfort to the user as the moving image.

As the second effect, it is not necessary to have multiple image processing circuit blocks, and so the control can be realized with no need to increase the circuit scale on rendering it as an LSI.

As the third effect, it is possible to reduce the power consumption of the circuits by preventing an increase in the circuit scale.

Sixth Embodiment

Figure 14:
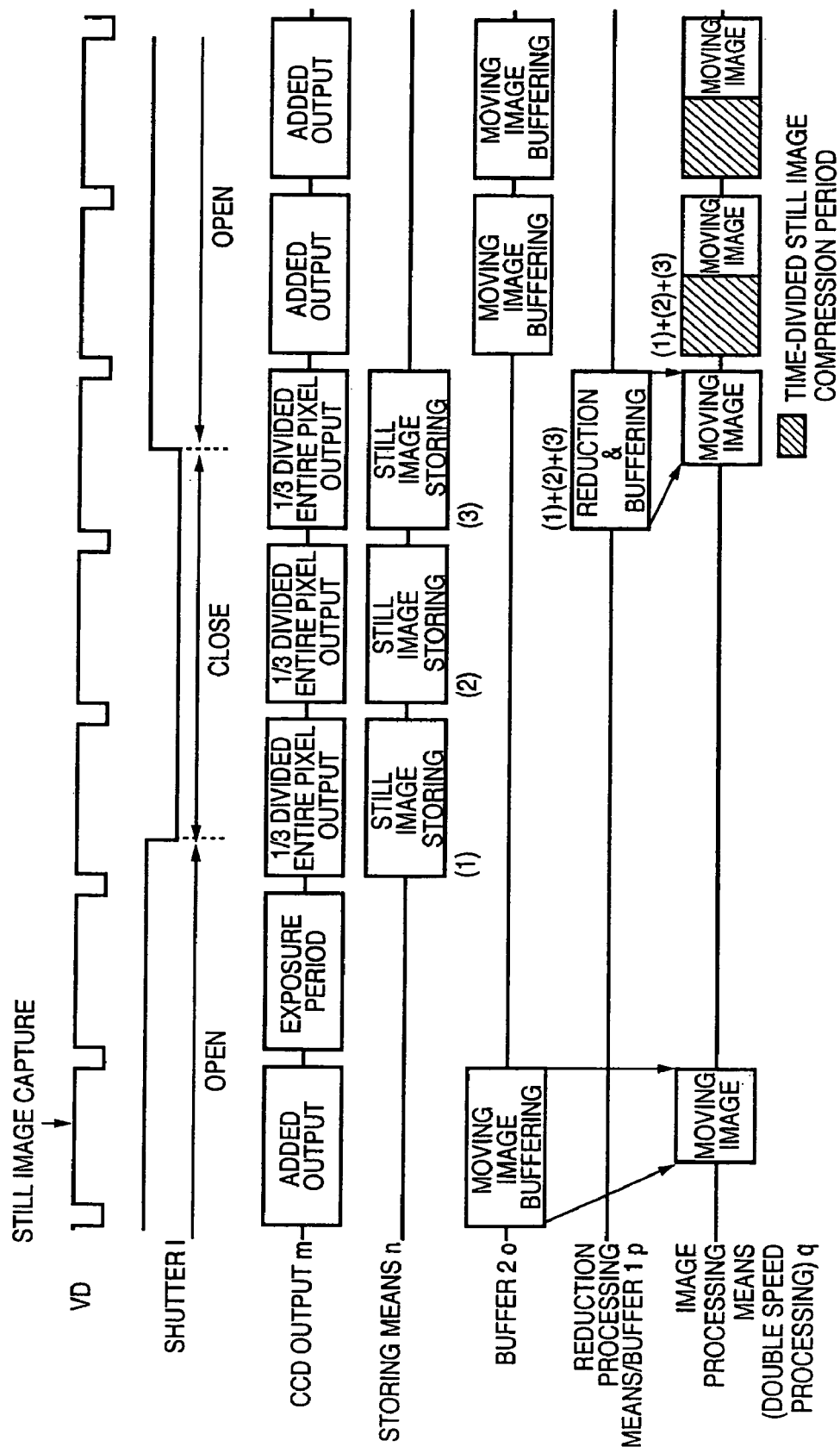
FIG. 14 is a diagram showing a timing chart representing the sixth embodiment of the present invention.

FIGS. 11, 12 and 14 are diagrams representing a sixth embodiment of the present invention. A block diagram representing an overview of the image sensing apparatus of the present invention is the same as the fifth embodiment in FIG. 11, and a block diagram showing the characteristics relating to this embodiment is the same as the fifth embodiment in FIG. 12. FIG. 14 is a timing chart of various processes representing the characteristics of this embodiment.

A description will be provided by using a timing chart shown in FIG. 14 as to the processing flow in the configuration of FIGS. 11 and 12.

In descending vertical order of the signals and processes of FIG. 14, VD indicates a vertical synchronizing signal for configuring the moving image, reference character l indicates a timing for opening and closing the mechanical shutter 33, reference character m indicates a timing representing a readout mode of the CCD as the image sensing device 1, reference character n indicates a timing for storing and storing the data in the entire pixel memory 6 and storing means 16 for storing the still image, reference character o indicates a buffering operation timing of the moving image data read out of a normal moving image readout channel by the buffer memory 32, and reference character p indicates a buffering operation timing of the reduction process for creating an image configuring the moving image from the still image data read out of the still image readout channel of the CCD with the reduction processing means 17 and the buffer 18 and the reduced data. Reference character q indicates a timing for performing the image processing with the image processing portion 7.
(Moving Image Sensing Period)

First, in a data flow upon sensing the moving image normally, the period up to the arrow portion below the point described as the still image capture in FIG. 14 represents a moving image sensing period, and the timing between a VD signal and a next VD signal represents a unit frame period configuring the moving image. The timing generator 4 is controlled in the moving image readout channel setup with the mechanical shutter 33 open so as to start reading out pixel imaging data corresponding to the moving image size.

Next, the data is inputted to the switching means 31 in the order of the pieces of the data digitized by the AD conversion portion 3 read out according to the timing of the timing generator 4. The switching means 31 is switched to the moving image mode upon sensing the moving image normally.

The image data for the moving image temporarily buffered in the buffer memory 32 has its moving image selected by the selecting means 19. After the elapse of a predetermined time from the start of moving image buffering in the portion of FIG. 14 indicated by reference letter o, the moving image processing shown in the portion of FIG. 13 indicated by reference letter q, is sequentially performed by image processing means 7. In this case, as the moving image processing starting time is delayed by the predetermined time, the moving image processing is set in a time period not to overtake the data buffered in the buffer 32 so as to perform the moving image processing at a high speed to an extent of keeping it within a moving image frame.

In this case, a high-speed clock is supplied by the PLL circuit 21 to have high-speed processing realized by the image processing portion 7. The contents to be image-processed in the description indicate a normal processing procedure, which performs a filtering process of the image and a luminance correction process, a color difference correction process, and the like thereof to create an optimal image. As details of the processing contents are techniques heretofore known, and are different depending on points of view of manufacturers and the like relating to the images, a description thereof will be omitted.

As the image processing portion 7 performs various kinds of image processing, the memory 8 temporarily buffers the image data that undergoes various kinds of image processing operations sequentially in chronological order by the image processing apparatus 7, and passes and receives the data to and from the image processing portion 7. As memory access and the like of the image processing portion is a technique heretofore known, a description thereof will be omitted.

Next, the data having completed the image processing operations is configured as one image within a frame period that is 1 VD period, and the data is passed to the encode processing portion 10, which is the next processing block. The encode processing portion 10 compresses the image-processed data in the JPEG format as a preset and predetermined image format, and the data is stored in the storage unit inside the image sensing apparatus by the switching means 11 or communicated to an external destination via the network communication portion 12.

As the image sensing apparatus is in such a state, the CPU 9 operates in response to a control instruction from outside to be in the moving image sensing mode. The destination of the moving image data is set correspondingly to a control command controlled from outside in advance, and is in a state of either communicating the moving image to the external devices via the network communication portion 12 or storing the moving image data sequentially in the storage unit 13.

(Capture Still Image)

A description will be provided as to the case where the CPU 9 receives a command for requesting a capture of a still image of a size larger than the image size configuring the moving image from any one of the network communication portion 12, the infrared remote control receiving portion 14 and the key input portion 15 during the aforementioned moving image sensing.

In the case of receiving the command at the point described as the still image capture shown in FIG. 14, the CCD as the image sensing device 1 is set to an entire pixel exposure period for dealing with the still image readout over the first 1 VD (vertical synchronizing signal) period after receiving the capture command. The mechanical shutter 33 remains open during that period as shown in the portion of FIG. 14 indicated by reference letter l, and no data is passed to the other processing circuit blocks during the exposure period of the CCD.

The CCD as the image sensing device 1 can read out the image data in response to the next VD frame signal. Here, the mechanical shutter 33 opened during the exposure period is closed in synchronization with the VD signal. It starts reading out the data exposed for 1 VD period from a time point when a ⅓ image of the image data corresponding to the still image is synchronized with the VD signal of the part of (1) described in FIG. 14, and has the data sequentially stored by the storing means 15 in the memory 6.

The pixel data of the ⅓ portion is read out in the VD period of the part of (2) described in the following FIG. 14, and is sequentially stored by the storing means 15 in the memory 6 as with the above described ⅓ pixels of the part of (1). The pixel data of the last ⅓ portion is read out in the VD period of the part of (3) described in the following FIG. 14, and is sequentially stored by the storing means 15 in the memory 6 as with the above described ⅓ pixels of the part of (3).

In the portion of FIG. 14 indicated by reference letter p, the image is reduced by the reduction processing means 17 and the reduced image is temporarily buffered by the buffer 18 in parallel with the still image processing operation as from the time point indicated by (1)+(2)+(3) so as to configure the processed image for the moving image. The image data for the moving image temporarily buffered by the buffer 18 has its moving image selected by the selecting means 19. After elapse of a predetermined time from the start of moving image buffering in the portion of FIG. 3 indicated by reference letter b, the moving image processing shown in the portion of FIG. 13 indicated by reference letter q is sequentially performed by image processing means 7. In this case, as the moving image processing starting time is delayed by the predetermined time, the moving image processing is set in a time period not to overtake the data buffered in the buffer 18 so as to perform the moving image processing at a high speed to an extent of keeping it within a moving image frame.

Thereafter, the mechanical shutter 33 is opened in synchronization with immediate VD signal timing. At the same time, a switch is made from the VD frame to the above described moving image mode readout channel so as to perform the moving image processing sequentially in the image processing portion 7.

Still image storage data stored as the still image data in the memory 6 is passed to the image processing portion 7 to perform the image processing in periods other than the moving image processing period after counting a predetermined VD period (that is, including a next count) as shown in blanks in the portion of FIG. 14 indicated by reference letter q.

When image-processing the still image not to influence the moving image processing time in the same image processing portion, it is not possible to perform data processing of the entire data of one still image of a size larger than the moving image. Therefore, the still image is processed by having each portion of the image divided correspondingly to the preset image areas divided over non-processing periods not performing the moving image processing as shown in FIG. 14.

Here, a description will be provided as to the mode for reading out all the pixels corresponding to the still image by exemplifying the case of the CCD of a primary-color filter and RGB pixel arrays of a Bayer array interlace readout method. It is a method of, when reading out the still image, reading out the pixels across three fields, where a first field line, a second field line and a third field line are configured by signal components. A first line of the first field is read out in order of R, Gr, R, Gr . . . , and a second line of the first field is normally a readout of a fourth line of CCD pixels (1 (first line)+3 (fields)) which is in order of Gb, B, Gb, B.

A next line is inversely arranged to have different reference data in each of the lines of the same field, such as R, Gr, R, Gr. Similarly, the first line of the second field is configured in reverse readout order to the first field. Similarly, the third field is arranged to be read out in the same order as the first field, that is, in order of a third line of the CCD pixels to the signal components of the pixels displaced by +3 lines.

The image of only the first field is read in 1 VD period of the moving image frame period, only the image of the second field is read in the following VD period, and the image of the third field is read in the following VD period. Thus, the pixels of the entire screen cannot be read out in 2 VD periods from the start of the readout. Therefore, it is arranged to move on to the next process after referring to the data after sequentially reading it out from the start of readout of the third field and the data stored in the memory 6.

The processing flow and processing timing of each of the blocks 10 to 13 of FIG. 11 from the image processing portion 7 onward correspond to the processing contents of the blocks 10 to 13 of FIG. 1 according to the first embodiment so as to perform exactly the same process.

According to this embodiment as with the fifth embodiment, a total of three frame periods of an exposure frame configuring the moving image during a CCD exposure period and the first frame and second frame periods configuring the moving image on reading out the CCD are in a state not capable of updating the image data so that the moving image blacks out only in these periods. In the moving image blackout period, the images in the period immediately before the CCD exposure frame period are sequentially rendered as the moving images.

As the first effect of realizing this embodiment as described above, it is possible, when capturing the still image while taking the moving image with the image sensing device 1 requiring the mechanical shutter 33, to reduce the frames blacking out as the moving image so as to provide the image with little discomfort to the user as the moving image.

As the second effect, it is not necessary to have multiple image processing circuit blocks, and so the control can be realized with no need to increase the circuit scale on rendering it as an LSI.

As the third effect, it is possible to reduce the power consumption of the circuits by preventing an increase in the circuit scale.

As the fourth effect, it is possible to realize a process capable of dealing with any high-pixel image sensing device.

Seventh Embodiment

Figure 15:
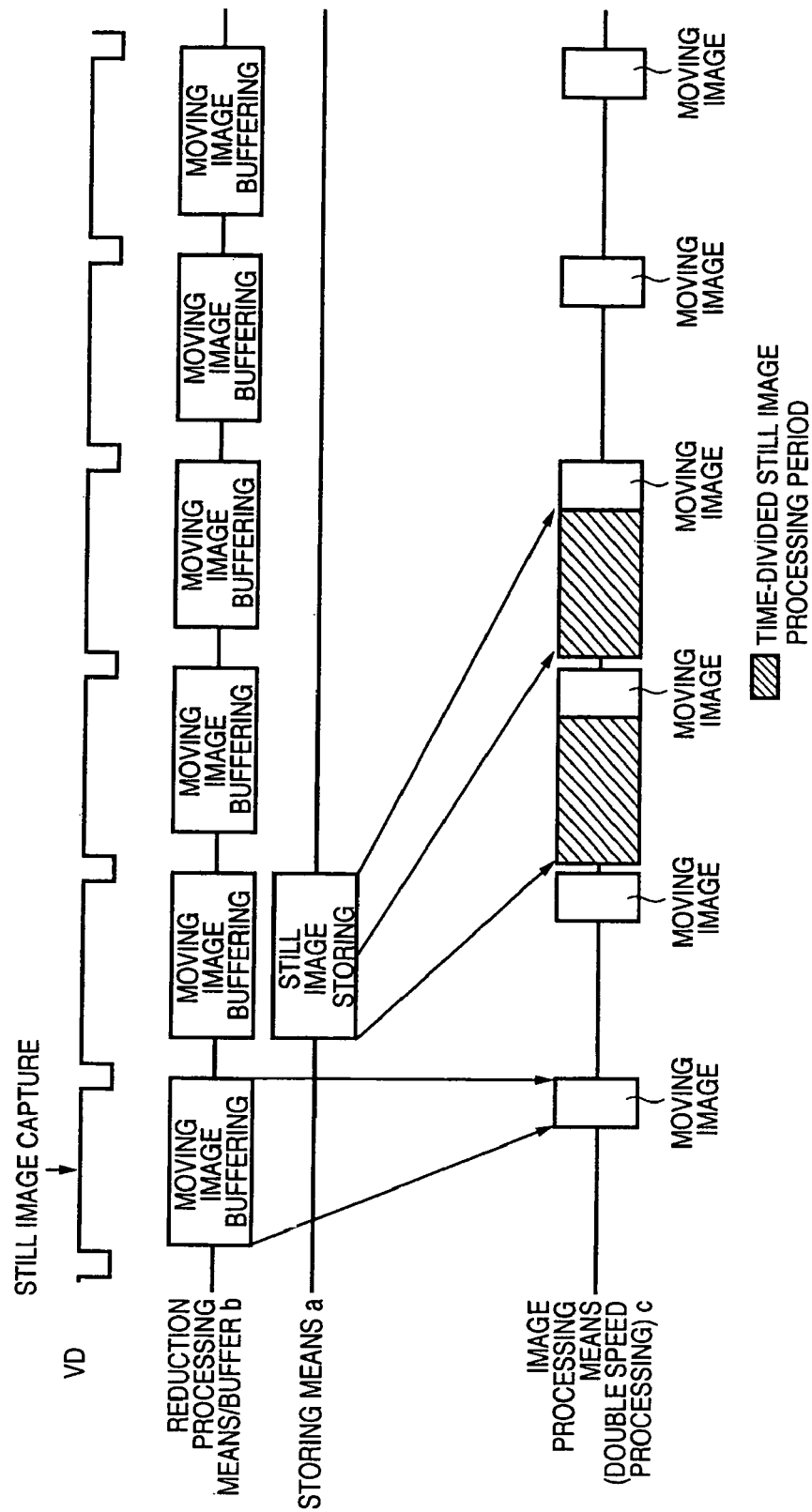
FIG. 15 is a diagram showing a timing chart representing the seventh embodiment of the present invention.

FIGS. 1, 2 and 15 are diagrams representing a seventh embodiment of the present invention. FIG. 1 has the same configuration as that according to the first embodiment, and FIG. 2 also has the same configuration as that according to the first embodiment. The difference lies in the contents is the PLL circuit 21 of FIG. 2, which are arranged to have a higher multiplication rate than the PLL circuit 21 shown in the first embodiment and speed up the operation of the blocks operated by the PLL circuit 21.

A description will be provided by using a timing chart shown in FIG. 15 as to the processing flow in the configuration.

In descending vertical order of the signals and processes of FIG. 15, VD indicates a vertical synchronizing signal for configuring the moving image, reference, character b indicates a reduction processing for creating an image configuring the moving image and buffering operation timing of the reduced data in the reduction processing means 17 and the buffer 18, reference character a indicates timing for storing and storing the data in the storing means 16 for storing the still image by the entire pixel memories 6 and 8, and reference character c indicates a timing for performing image processing in the image processing portion 7.

(Moving Image Sensing Period)

First, in a data flow upon sensing the moving image normally, the period up to an arrow portion below the point described as the still image capture in FIG. 15 represents a moving image sensing period, and the timing between a VD signal and a next VD signal represents a unit frame period configuring the moving image. The timing generator 4 is controlled to start reading out the imaging data corresponding to all the pixels with the image sensing device 1 ready for reading out all the pixels.

Next, according to timing of the timing generator 4, the data digitized by the AD conversion portion 3 undergoes image reduction by the reduction processing means 17 and temporary buffering of the reduced image by the buffer 18 in the order of the pieces of the data read out so as to configure the processed image for the moving image.

The image data for the moving image temporarily buffered in the buffer 18 has its moving image selected by the selecting means 19. After the elapse of a predetermined time from the start of moving image buffering in the portion of FIG. 3 indicated by reference letter b, the moving image processing shown in the portion of FIG. 3 indicated by reference letter c is sequentially performed by the image processing means 7. In this case, the predetermined time is longer than the predetermined time according to the first embodiment, and so the moving image processing starting time is accordingly delayed.

The moving image processing is set in a time period not to overtake the data buffered in the buffer 18 so as to perform the moving image processing at high speed to an extent of keeping it within a moving image frame. As the high-speed clock of the PLL circuit 21 has a higher multiplication rate than that of the PLL circuit 21 circuit block of the first embodiment, the moving image can be processed at a higher speed. The processing contents and signal flow of the other blocks indicated are the same as the contents according to the first embodiment.

(Capture Still Image)

According to this embodiment, however, the processing speed of the moving image is increased as indicated above. Therefore, the non-processing periods are extended when having frame pixel data configured as the still image divided for each of the areas and image-processed in the non-processing periods. As the non-processing periods are extended, divided amounts become smaller when divided into the blanks of FIG. 15. FIG. 15 shows an example in which the processing is possible in 2 VD periods.

This embodiment is described a configuration example of the first embodiment. However, the same is applicable to the second, third, fourth, fifth and sixth embodiments, where the moving image processing after the moving image buffering is sped up so as to reduce the periods divided by the still image processing. It is also arranged to process a large number of frames capable of continuous sensing on receiving a still image continuous sensing command.

As the first effect of realizing this embodiment as described above, it is possible, when capturing the still image of a larger size than the moving image while taking the moving image, to deliver it on the network or record it without lowering the frame rate of the moving image at all.

As the second effect, it is possible to reduce the number of divisions of the still image and reduce the still image processing period.

As the third effect, it is possible to increase the number of frames of large-screen still image continuous sensing.

As the fourth effect, it is possible to reduce the amount of the entire pixel memory 6 if the large-screen still image continuous sensing is within a prescribed number of frames.

[Embodiment of Moving Image and Still Image Processing Means]

(Example of the Structure)

Figure 16:
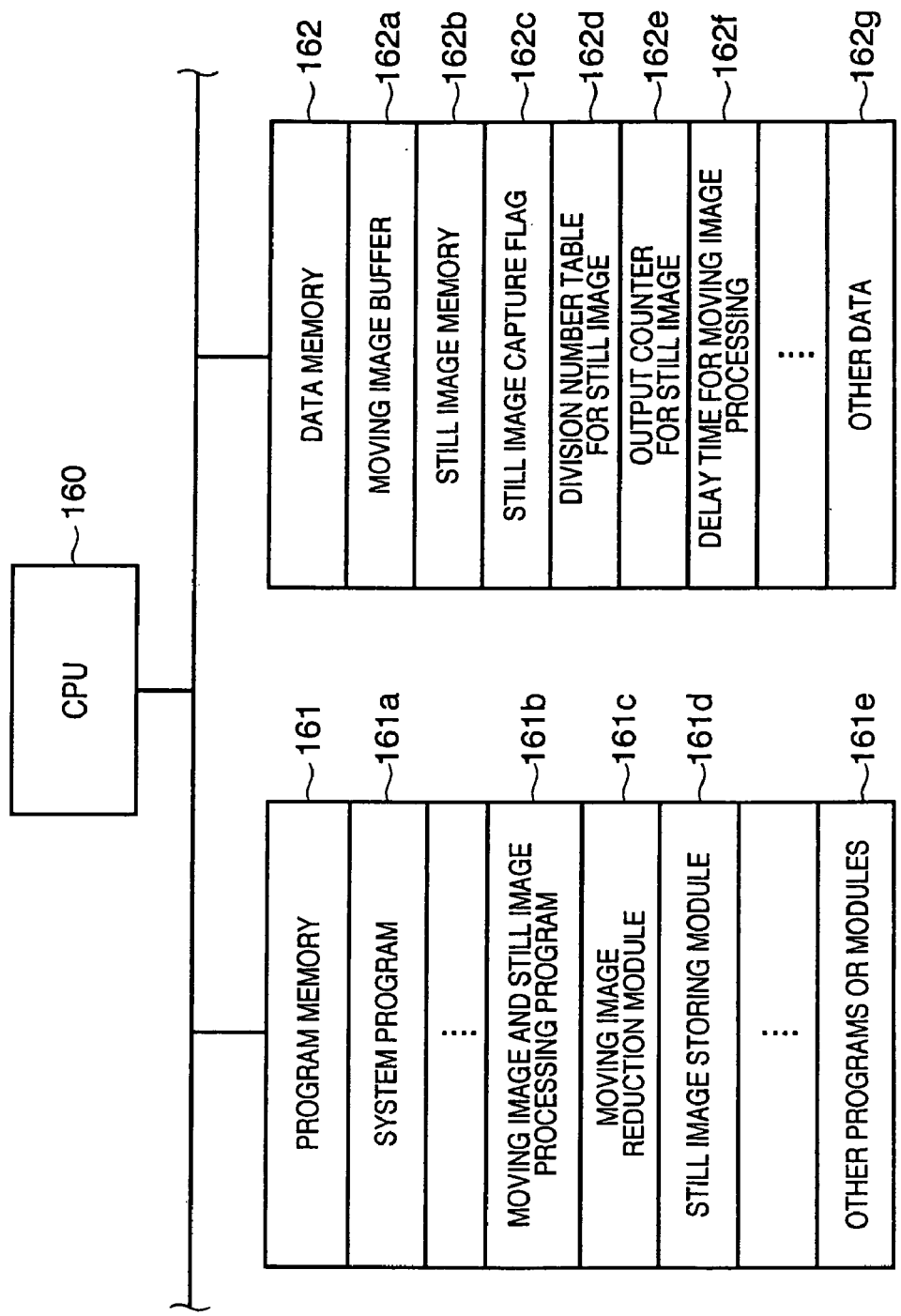
FIG. 16 is a configuration block diagram showing a hardware structure of a moving image and still image processing means of the present invention.

FIG. 16 is a configuration block diagram showing a hardware structure of a moving image and still image processing means of the present invention. In FIG. 16, various processing blocks are realized by executing respective programs, however, some of the processing blocks can be realized by hardware logic.

In FIG. 16, reference numeral 160 indicates a CPU controlling the moving image and still image processing means 5 or 24. This CPU may be used for processing of the control means 9 or the other blocks.

Reference numeral 161 indicates a program memory for storing programs. The program memory 161 includes ROM, RAM, a disc and so on in which preferable programs are stored. In FIG. 16, programs especially related to the first embodiment are shown. Reference numeral 161a indicates an area storing a system program which controls the whole apparatus by itself or cooperation with other CPUs. Reference numeral 161b indicates an area storing a control sequence program of the moving image and still image processing means 5 or 24, which is shown as a flowchart of the first embodiment in FIG. 18. Reference numeral 161c indicates an area storing an image reduction module which reduces the image data for the moving image in the reduction processing means 17. Reference numeral 161d indicates an area storing a still image storing module which stores still image data in the memory 6 by the storing means 16. Reference numeral 161e indicates an area storing the other programs or modules corresponding to the first or the other embodiments.

Reference numeral 162 indicates a data memory for storing data. The data memory 162 includes ROM, RAM, a disc and so on in which preferable programs are stored. In FIG. 16, data especially related to the first embodiment are shown. Reference numeral 162a indicates an area as a moving image buffer (for example, corresponding to the buffer 18 in FIG. 2) buffering the image data reduced by the image reduction module 161c. Reference numeral 162b indicates an area storing a still image by the still image storing module 161d. Reference numeral 162c indicates an area storing a flag showing whether or not the still image capture has been requested. Reference numeral 162d indicates an area storing a table of a division number representing the number of portions into which the still image is divided, as its example is shown in FIG. 17. The division number may have been already set, but not selected from the table 162d. Reference numeral 162e indicates an area storing a still image output counter showing whether or not the divided whole still image data have been processed. Reference numeral 162f indicates an area storing a table of delay time from moving image getting time to start time of moving image processing, as its example is shown in FIG. 17. The delay time may have been already set, but not selected from the table 162f. Reference numeral g indicates an area storing the other data not shown in FIG. 16.

FIG. 17 is a diagram showing a table 162d for a number representing the number of portions in which a still image is divided, and a table 162f for the delay time until the starting of a moving image processing of the present invention. The tables 162d and 162f can be combined to make one table.

For example, the table 162d is formed so that the division number 175 is determined to correspond to the CD cycle time 171, the delay time of the moving image processing 172, the moving image size 177, the still image size 174 and so on. The table 162f is formed so that the delay time 179 is determined to correspond to the CD cycle time 176, the moving image size 177, the moving image processing rate (or clock rate) and so on.

(Control Sequence Program of the Moving Image and Still Image Processing Means)

Figure 18:
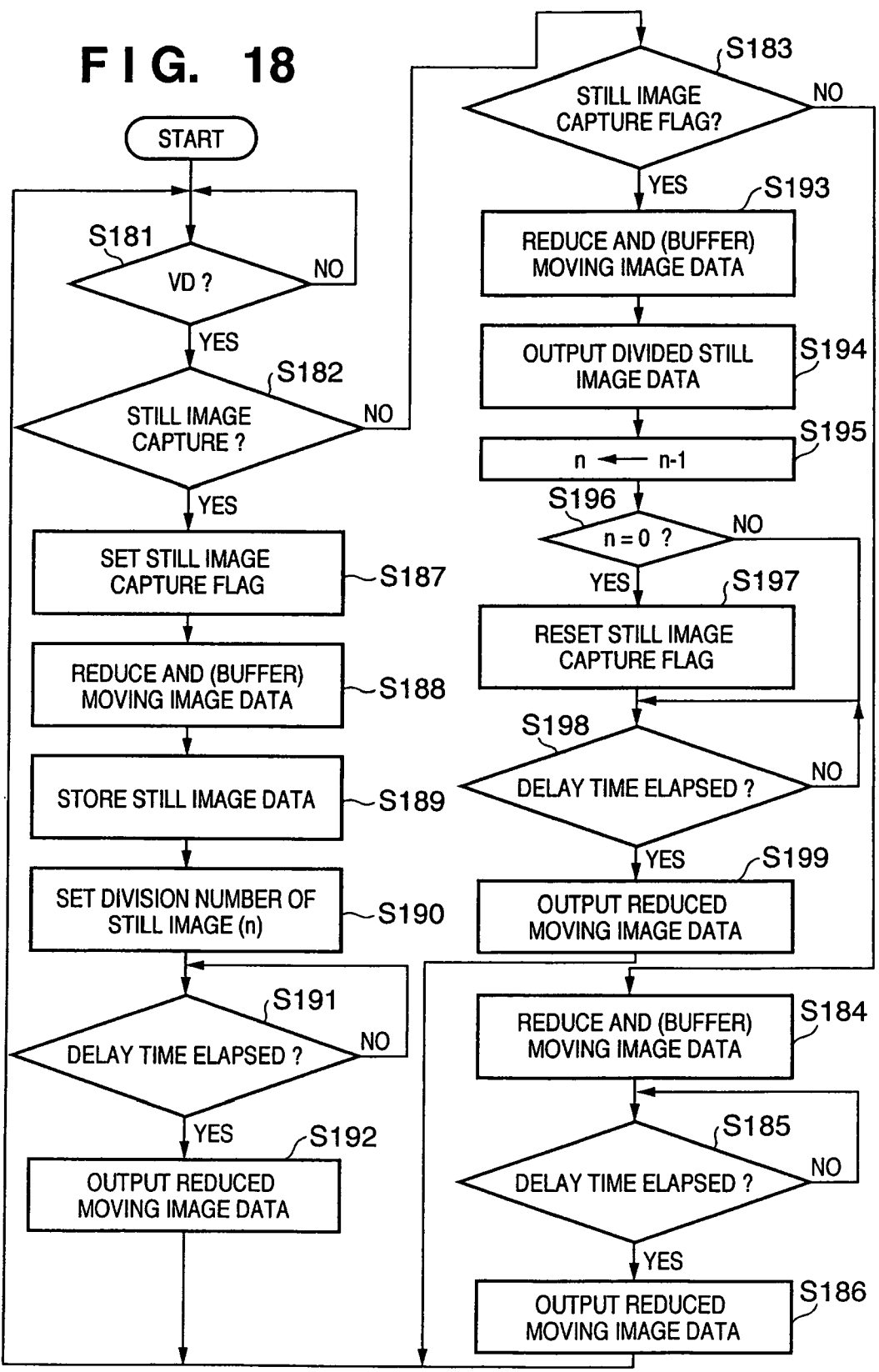
FIG. 18 is a flowchart showing a sequence of steps at the moving image and still image processing means of the present invention.

FIG. 18 is a flowchart showing a sequence of steps at the moving image and still image processing means of the present invention. FIG. 18 is described along a sequence of the first embodiment.

Step S181 is a step for synchronizing the image processing with the VD (vertical synchronizing signal). When detecting VD in step S181, CPU 160 determines whether there is a still image capture operation between the last VD and the current VD in step S182. Since, at the first VD in FIG. 3, there is no still image capture operation, the CPU 160 determines whether or not the still image capture flag 162c is set in step S183. Since, at the first VD in FIG. 3, the flag 162c is not set, a flow is advanced to step S184. In step S184, the CPU 160 instructs the reduction and buffering of the moving image data. In step S184 of the second and third embodiment, the buffering process is deleted. After waiting until the delay time has elapsed in step S185, the CPU 160 outputs the reduced moving data to the image processing means 7 in step S186. In the third embodiment, the output destination is the encode processing portion 10.

When detecting the next VD (the second VD in FIG. 3), the CPU 160 advances from S182 to S187 since there has been a still image capture operation after the last VD. In step S187, the CPU 160 sets the still image capture flag 162c. The CPU 160 instructs the storing of the still image data in the memory 6 in step S189 as well the reduction and buffering of the moving image data in step S188 in parallel. In step S190, the CPU 160 sets the division number n of the still image data in the counter 162e. After waiting until the delay time has elapsed in step S191, the CPU 160 outputs the reduced moving data to the image processing means 7 in step S192.

When detecting the next VD (the third VD in FIG. 3), the CPU 160 advances from S183 to S193 since the still image capture flag 162c has been set in step S187. In step S193, the CPU 160 instructs the reduction and buffering of the moving image data. In step S194, the CPU 160 outputs each divided still image data to the image processing means 7. In step S195, the CPU 160 decrements the counter 162e. In step S196, the CPU 160 determines whether or not the counter 162e=0. Since the counter is not 0, after waiting until the delay time has elapsed in step S198, the CPU 160 outputs the reduced moving data to the image processing means 7 in step S199. Until the counter 162e=0, the output to the image processing means 7 (or the encode processing portion 10 in the third embodiment) of the divided still image data and the reduced moving image data steps S193-199 are repeated.

For example in FIG. 3, when 4 divided still image data has been outputted, the counter $162e=0$. In this case, the CPU 160 resets the still image capture flag 162c in step S197. Therefore, from the next VD, the CPU 160 executes steps S184-S186 to output only the reduced moving image data to the image processing means 7.

It is apparent that flowcharts of the other embodiments can be also made by modifying FIG. 18 or adding some steps to FIG. 18.

Other Embodiments of the Present Invention

Though the first to seventh embodiments are described independently in this specification, they can be combined. Further, the intermediate embodiments which are made by modifying the typical embodiments described above or by adding/deleting some elements to/from those embodiments are included in the present invention.

The means configuring the image sensing apparatus and the steps of the imaging method of the embodiments of the aforementioned present invention can be realized by operation of the programs stored in the RAM, ROM and the like of the computer. The present invention includes the programs and a computer-readable storing medium having the programs recorded therein.

The present invention can be implemented as a system, an apparatus, a method, a program or a storing medium for instance as the embodiment thereof. To be more precise, it is applicable either to a system configured by multiple devices or to an apparatus configured by one device.

The present invention also includes the case of accomplishing it by directly or remotely supplying the program (program corresponding to the flowcharts shown in FIGS. 1 to 15 of the embodiment) of software for realizing the aforementioned functions of the embodiments to the system or the apparatus so as to have the supplied program code read out and executed by the computer of the system or the apparatus.

Therefore, the present invention is also realized by the program code itself installed on the computer for the sake of realizing the functions and processes of the present invention on the computer. To be more specific, the present invention also includes the computer program itself for realizing the functions and processes of the present invention.

In that case, it may be in the form of an object code, a program executed by an interpreter, script data supplied to an OS (operating system) or the like if it has the functions of the program.

Examples of the storing medium for supplying the program code include a floppy (registered trademark) disk, a hard disk, an optical disk, a magneto-optical disk, an MO, a CD-ROM, a CD-R, a CD-RW, a magnetic tape, a nonvolatile memory card, a ROM and a DVD (a DVD-ROM, a DVD-R).

As for the method of supplying the program, it is also possible to connect to a home page on the Internet by using a browser of a client computer and download the computer program itself of the present invention or a compressed file including an auto-install function to the storing medium such as a hard disk so as to supply the program.

It is also realizable by dividing the program code configuring the program of the present invention into multiple files and downloading each of the files from a different home page. To be more specific, the present invention also includes a WWW server for downloading program files for realizing the functions and processes of the present invention on the computer to multiple users.

It is also possible to distribute the program of the present invention to the users by encrypting and storing it in the storing medium such as a CD-ROM, have the users having cleared predetermined conditions, download key information for decrypting it from a home page via the Internet, and have the encrypted program executed by using the key information and installed on the computer so as to realize it.

Further, it is to be understood that the functions of the above described embodiments may be accomplished not only by executing the program read out by a computer, but also by causing an OS (operating system) or the like which operates on the computer to perform a part or all of the actual operations based on instructions of the program.

Further, it is to be understood that the functions of the above described embodiments may be accomplished by writing the program read out from the storing medium into a memory provided in an expansion board inserted into a computer or in an expansion unit connected to the computer and then causing a CPU or the like provided in the expansion board or the expansion unit to perform a part or all of the actual operations based on instructions of the program.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-133185, filed on Apr. 28, 2005, which is hereby incorporated by reference herein in its entirety.

What is claimed is:

1. An image sensing apparatus comprising:
an inputting unit configured to input sensed image data;
a reducing unit configured to reduce the sensed image data into reduced image data of a first density;
a detecting unit configured to detect an instruction for sensing a still image during sensing of a moving image;
a storing control unit configured to control a memory to store image data of a second density higher than the first density based on the sensed image data inputted after detection of the instruction for sensing the still image; and
a processing unit configured to, in a case where the detecting unit detects the instruction for sensing a still image during sensing of a moving image, process a first moving image frame by using first reduced image data of the first density during a first time period, process a second moving image frame next to the first moving image frame by using second reduced image data of the first density during a second time period after the first time period, divide a still image frame into a plurality of parts by using the image data of the second density based on the sensed image data inputted after detection of the instruction for sensing the still image, process a first part of the divided still image frame during a third time period between the first and second time periods, process a third moving image frame next to the second moving image frame during a fourth time period after the second time period, and process a second part of the divided still image frame during a time period between the second time period and the fourth time period,
wherein during the third time period, the processing unit does not process the first or second moving image frames regardless of whether or not the detecting unit detects the instruction for sensing the still image during sensing of the moving image.

2. The apparatus according to claim 1, wherein the processing unit processes a part of the still image frame during the time period during which the second moving image frame is stored in the memory in a case where the detecting unit detected the instruction for sensing the still image of the second density during sensing of the moving image frame of the first density.

3. The apparatus according to claim 1, wherein the processing unit divides the still image frame into the plurality of parts based on at least an image size of the still image frame, an image size of the moving image frame, and a cycle time of a vertical synchronization signal of the moving image frame.

4. The apparatus according to claim 2, wherein the processing unit has a table for setting a delayed time for which the second moving image frame is stored in the memory, and the delayed time is set based on at least a cycle time of a vertical synchronizing signal, the first density, and the processing rate of the processing unit.

5. The apparatus according to claim 1, further comprising an image sensing unit having a moving image channel reading out one of the moving image frames within a cycle time of a vertical synchronizing signal, and a still image channel reading out the still image frame over plural cycle times of the vertical synchronizing signal, and first processing of one of the moving image frames by processing unit after detecting of the instruction for sensing the still image is performed based on one of the moving image frames acquired by reducing the still image frame composed of plural still image data obtained through the still image channel.

6. The apparatus according to claim 5, wherein when the image sensing unit needs exposure time to obtain still image data of the still image frame through the still image channel, the processing unit uses a first cycle time of the vertical synchronizing signal as the exposure time, the next plural successive cycle time of the vertical synchronizing signal for obtaining image data through the still image channel, and the further next cycle time of the vertical synchronizing signal for composing the obtained still image data and reducing the composed still image data.

7. A method of controlling an image sensing apparatus comprising:
an inputting step of inputting sensed image data;
a reducing step of reducing the sensed image data into reduced image data of a first density;
a detection step of detecting an instruction for sensing a still image during sensing of a moving image;
a storing controlling step of controlling a memory to store image data of a second density higher than the first density based on the sensed image data inputted after detection of the instruction for sensing the still image; and
a processing step of, in a case where the detecting step detects the instruction for sensing a still image during sensing of a moving image, processing a first moving image frame by using first reduced image data of the first density during a first time period, processing a second moving image frame next to the first moving image frame by using second reduced image data of the first density during a second time period, dividing a still image frame into a plurality of parts by using the image data of the second density based on the sensed image data inputted after detection of the instruction for sensing the still image during a third time period, processing a first part of the divided still image frame during a third time period between the first and second time periods, processing a third moving image frame next to the second moving image frame during a fourth time period after the second time period, and processing a second part of the divided still image frame during a time period between the second time period and the fourth time period, wherein during the third time period, the processing step does not process the first or second moving image frames regardless of whether or not the detecting step detects the instruction for sensing the still image during sensing of the moving image.

8. The method according to claim 7, wherein the processing step processes a part of the still image frame during the time period during which the second moving image frame is stored in the memory in a case where the instruction for sensing the still image of the second density was detected in the detection step during sensing of the moving image frame of the first density.

9. The method according to claim 7, wherein the processing step divides the still image frame into the plurality of parts based on at least an image size of the still image frame, an image size of the moving image frame, and a cycle time of a vertical synchronization signal of the moving image frame.

10. The method according to claim 8, wherein the delayed time during which the second moving image frame is stored in the memory is set based on at least a cycle time of a vertical synchronizing signal, the first density, and the processing rate of the processing step.

11. The method according to claim 7, further comprising an image sensing step of sensing an image using an image sensing unit having a moving image channel reading out one of the moving image frames within a cycle time of a vertical synchronizing signal, and a still image channel reading out the still image frame over plural cycle times of the vertical synchronizing signal, and first processing of one of the moving image frames in the processing step after detecting of the instruction for sensing the still image is performed based on the first moving image frame acquired by reducing the still image frame composed of plural still image data obtained through the still image channel.

12. The method according to claim 11, wherein in said processing step, when the image sensing unit requires data representing an exposure time to obtain the still image data of the still image frame through the still image channel, a first cycle time of the vertical synchronizing signal is used as the exposure time, a next plural successive cycle time of the vertical synchronizing signal is used for obtaining image data through the still image channel, and a further next cycle time of the vertical synchronizing signal is used for composing the obtained still image data and reducing the composed still image data.

13. A non-transitory computer readable storage medium containing computer executable instructions for a computer, the computer executable instructions comprising:
computer-executable instructions for performing a step of inputting sensed image data;
computer-executable instructions for performing a step of reducing the sensed image data into reduced image data of a first density;
computer-executable instructions for performing a step of detecting an instruction for sensing a still image during sensing of a moving image;
computer-executable instructions for performing a step of controlling a memory to store image data of a second density higher than the first density based on the sensed image data inputted after detection of the instruction for sensing the still image; and
computer-executable instructions for, in a case where the detecting step detects the instruction for the sensing a still image during sensing of a moving image, processing a first moving image frame by using first reduced image data of the first density during a first time period, processing a second moving image frame next to the first moving image frame by using second reduced image data of the first density during a second time period after the first time period, dividing a still image frame into a plurality of parts by using the image data of the second density based on the sensed image data inputted after detection of the instruction for sensing the still image, processing a first part of the divided still image frame during a third time period between the first and second time periods, processing a third moving image frame next to the second moving image frame during a fourth time period after the second time period, and processing a second part of the divided still image frame during a time period between the second time period and the fourth time period, wherein during the third time period, the processing step does not process the first or second moving image frames regardless of whether or not the detecting step detects the instruction for sensing the still image during sensing of the moving image.

* * * * *